United States Patent
Foggia et al.

(10) Patent No.: US 12,037,117 B2
(45) Date of Patent: Jul. 16, 2024

(54) UNMANNED AERIAL VEHICLE AND PAYLOAD DELIVERY SYSTEM

(71) Applicant: Flirtey Holdings, Inc., Reno, NV (US)

(72) Inventors: John R Foggia, Reno, NV (US); Andrianah Jade Kilgore, Reno, NV (US); Matthew Sweeny, Reno, NV (US)

(73) Assignee: Flirtey Holdings, Inc., Reno, NV (US)

( * ) Notice: Subject to any disclaimer, the term of this patent is extended or adjusted under 35 U.S.C. 154(b) by 487 days.

(21) Appl. No.: 16/817,427

(22) Filed: Mar. 12, 2020

(65) Prior Publication Data
US 2020/0207474 A1 Jul. 2, 2020

Related U.S. Application Data

(63) Continuation of application No. PCT/US2018/050933, filed on Sep. 13, 2018.
(Continued)

(30) Foreign Application Priority Data

May 18, 2018 (GB) ...................................... 1808075

(51) Int. Cl.
*B64C 27/08* (2023.01)
*B64C 39/02* (2023.01)
(Continued)

(52) U.S. Cl.
CPC ................ *B64D 1/22* (2013.01); *B64C 27/08* (2013.01); *B64C 39/024* (2013.01); *B64D 1/02* (2013.01);
(Continued)

(58) Field of Classification Search
None
See application file for complete search history.

(56) References Cited

U.S. PATENT DOCUMENTS 8,591,161 B1  11/2013  Bernhardt
9,174,733 B1  11/2015  Burgess et al.
(Continued)

FOREIGN PATENT DOCUMENTS

EP      3115948 A1   1/2017
WO   2017151356 A1   9/2017

OTHER PUBLICATIONS

International Search Report and Written Opinion dated Jan. 22, 2019 for PCT Application No. PCT/US2018/050933.

*Primary Examiner* — Aniss Chad
*Assistant Examiner* — Jennifer M Anda
(74) *Attorney, Agent, or Firm* — EIP US LLP

(57) ABSTRACT

Embodiments described herein are methods and systems that relate to delivery of a payload to a particular delivery surface. A payload is collected at a first physical location using a retractable delivery mechanism of a UAV, and the UAV flies to a designated second physical location, whereupon sensor data is obtained using one or more sensors of the UAV. The sensor data is used to obtain characteristics of an area which may be used as a delivery surface at the second physical location. An actual delivery surface is selected based on criteria in the form of rule data specifying an appropriate delivery surface and the sensor data. Once the delivery surface has been selected the retractable delivery lowers the payload towards the selected delivery surface.

16 Claims, 26 Drawing Sheets

Related U.S. Application Data

(60) Provisional application No. 62/558,138, filed on Sep. 13, 2017.

(51) Int. Cl.
  *B64D 1/02* (2006.01)
  *B64D 1/22* (2006.01)
  *B64U 10/10* (2023.01)
  *B64U 30/20* (2023.01)
  *B64U 101/60* (2023.01)

(52) U.S. Cl.
  CPC .............. *B64U 10/10* (2023.01); *B64U 30/20* (2023.01); *B64U 2101/60* (2023.01); *B64U 2201/10* (2023.01)

(56) References Cited

U.S. PATENT DOCUMENTS

| | | |
|---|---|---|
| 9,580,173 B1 | 2/2017 | Burgess et al. |
| 9,650,136 B1 | 5/2017 | Haskin et al. |
| 9,676,481 B1 | 6/2017 | Buchmueller et al. |
| 9,688,404 B1 | 6/2017 | Buchmueller et al. |
| 9,817,396 B1 | 11/2017 | Takayama et al. |
| 9,969,494 B1 | 5/2018 | Buchmueller et al. |
| 2017/0174343 A1 | 6/2017 | Erickson et al. |
| 2019/0241266 A1* | 8/2019 | Thompson ........... G06Q 10/083 |
| 2019/0248485 A1* | 8/2019 | Ulaganathan .......... G05D 1/104 |
| 2020/0286389 A1* | 9/2020 | Speasl ................... G06Q 10/08 |

* cited by examiner

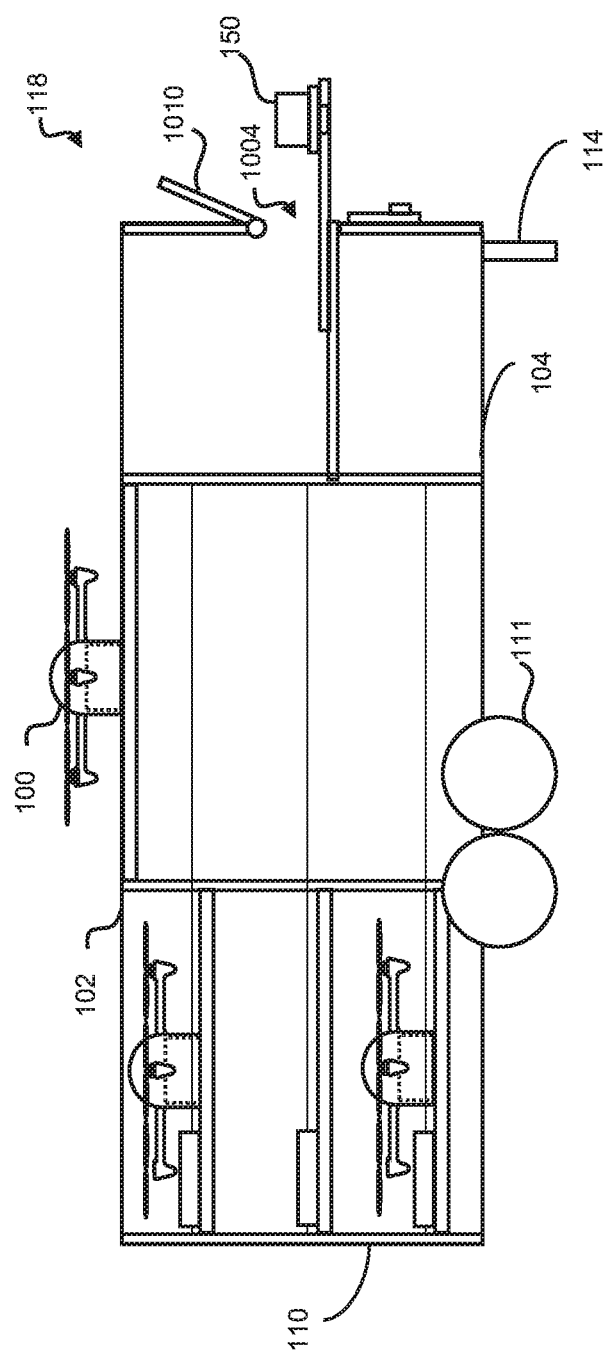

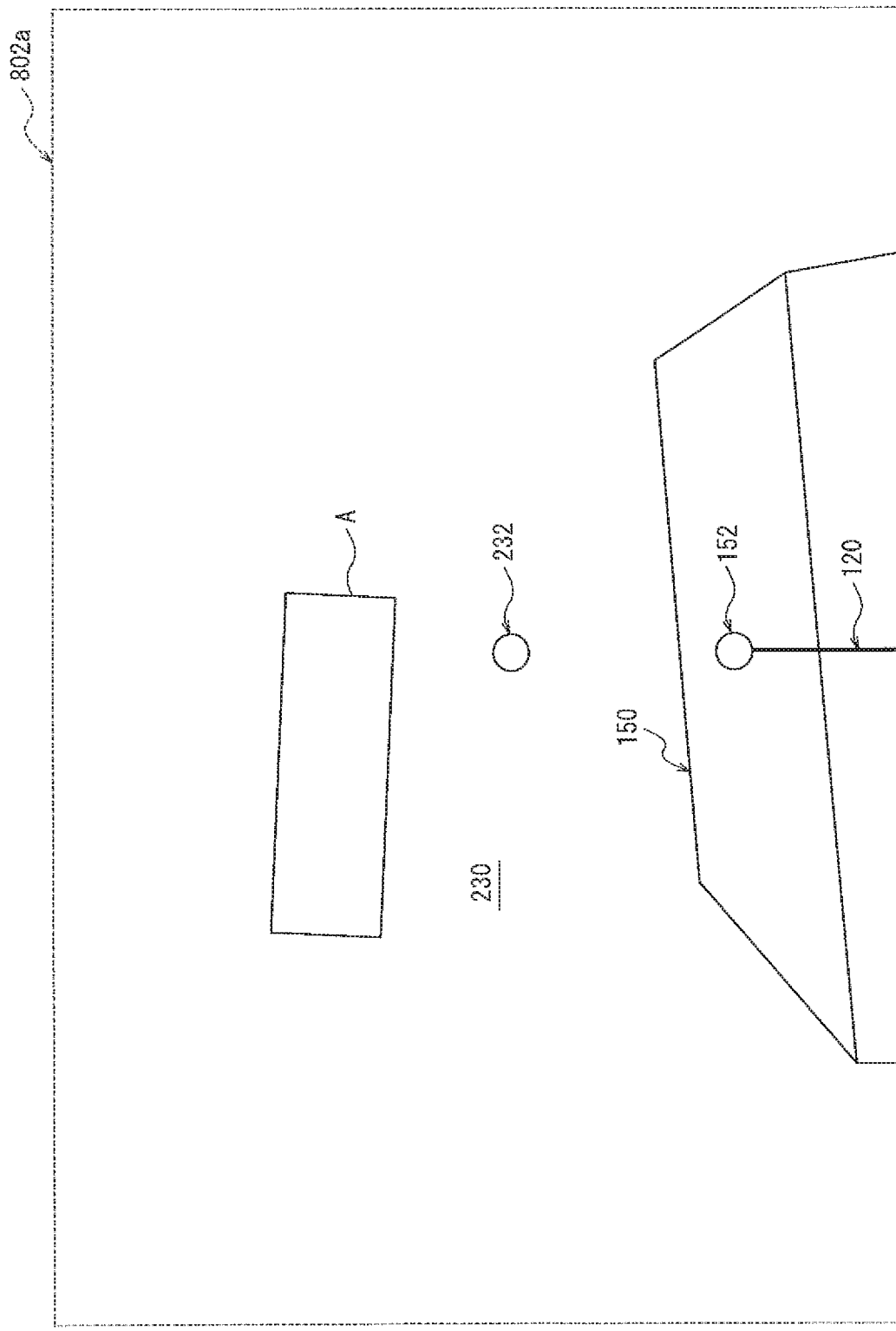

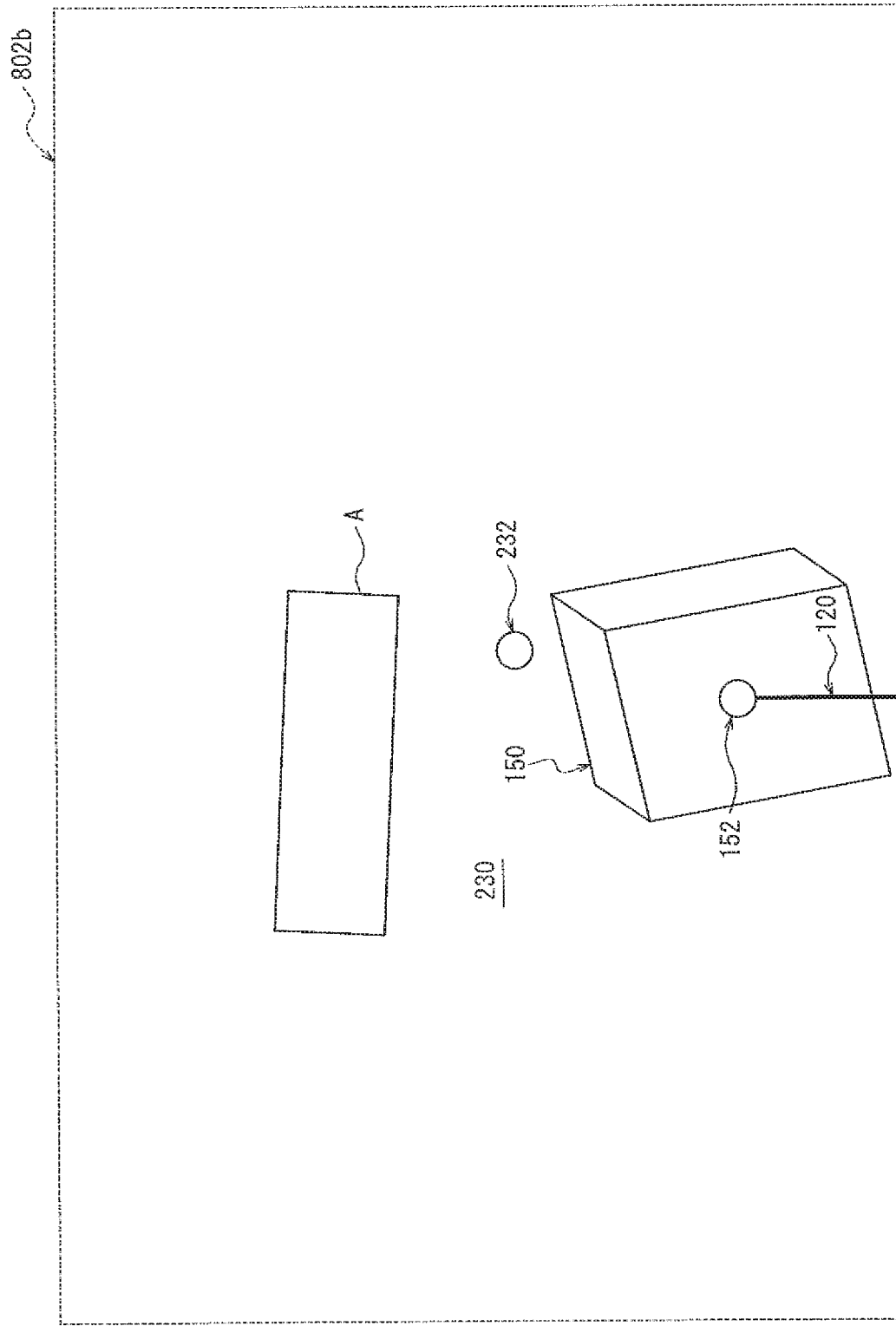

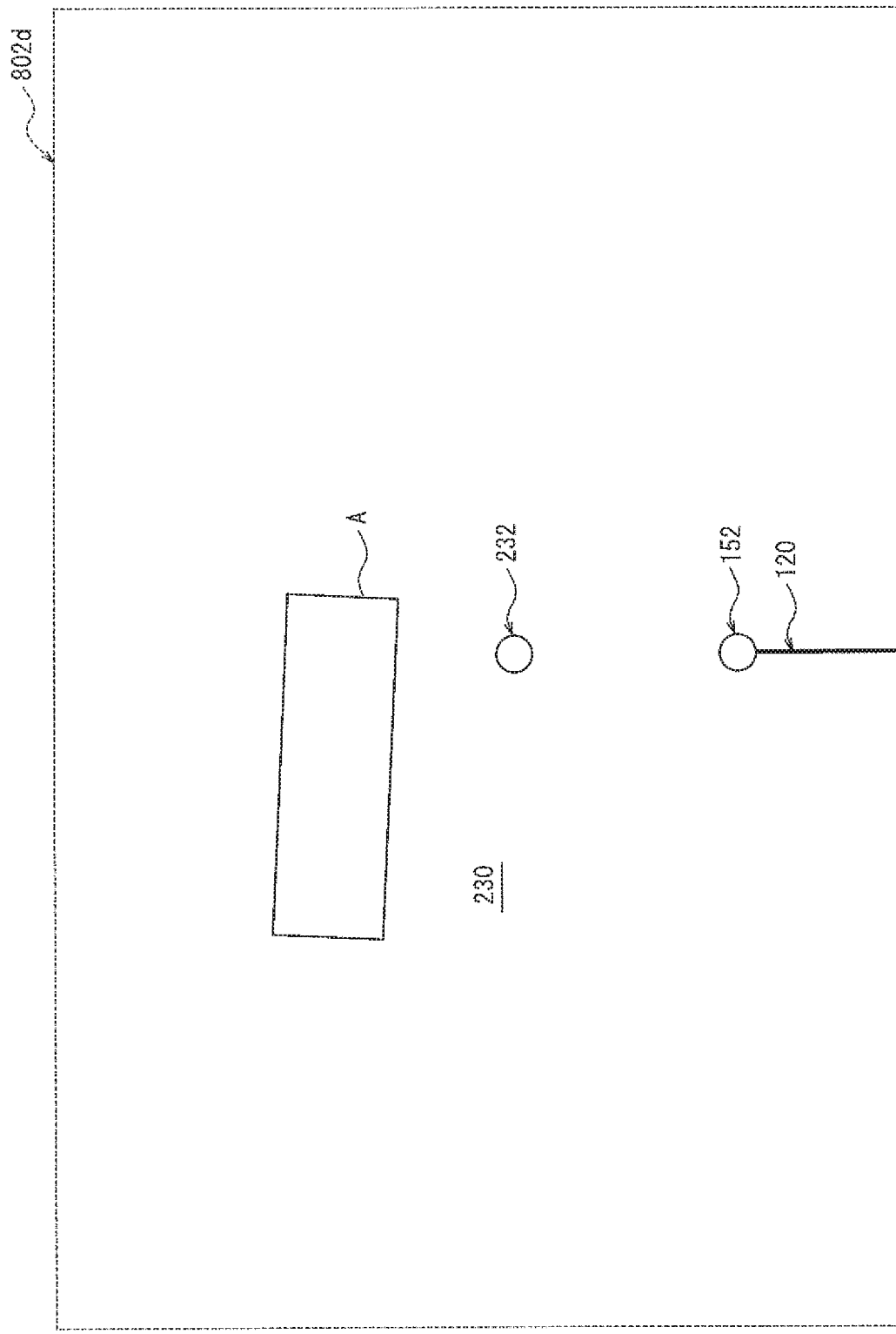

UNMANNED AERIAL VEHICLE AND PAYLOAD DELIVERY SYSTEM

CROSS-REFERENCE TO RELATED APPLICATIONS

This application is a continuation of International Application No. PCT/US2018/050933, filed Sep. 13, 2018, which claims the benefit of U.S. Provisional Application No. 62/558,138, filed Sep. 13, 2017 and claims priority to GB Application No. GB1808075.4, filed May 18, 2018, under 35 U.S.C. § 119(a). Each of the above-referenced patent applications is incorporated by reference in its entirety.

BACKGROUND

Advancements in autonomous aerial vehicle technology are opening up new possibilities in the area of package delivery systems. Unmanned Aerial Vehicles (UAVs), otherwise known as drones, for example, in the form of small rotor-based vertical takeoff and landing (VTOL) craft, can be configured to carry and deliver small payloads. Small payloads, for example, may include commercial parcels that would otherwise be delivered by persons or land-based delivery vehicles (e.g., automobiles or trucks). While particularly suited to take off and landing in confined spaces, the use of drones to deliver payloads to uncontrolled landing sites, such as residential addresses, presents a number of challenges. Challenges introduced by the use of drones in this capacity include, for example, risk of damage or loss of the drone caused by collision with various obstacles, particularly during delivery. Further, while UAVs lend themselves to landing at and/or delivering to a wide variety of destinations, understanding exactly what these destinations are in terms of physical attributes, limitations and suitability for delivery, presents technical challenges.

SUMMARY

According to aspects of the present disclosure there is provided a method and system according to the appended claims.

In a first aspect, a method is provided, the method comprising:
causing an unmanned aerial vehicle (UAV) to pick up and secure a payload at a first physical location using a retractable delivery mechanism;
generating control commands configured to cause the UAV to fly from the first location to a designated second physical location;
obtaining sensor data at the designated second physical location using one or more sensors of the UAV;
based on the sensor data, obtaining one or more characteristics of an area which may be used as a delivery surface at the second physical location;
obtaining rule data indicative of one or more criteria associated with an appropriate delivery surface;
based on the obtained one or more characteristics and the obtained rule data, selecting a delivery surface in the area; and
causing the retractable delivery mechanism to lower the payload towards the selected delivery surface.

The obtained one or more characteristics that may be utilized in determining a suitable delivery surface include a type of material on at least part of the area; a size of at least part of the area; a slope of at least part of the area; a distance between at least part of the area and a selected delivery location; and a proximity from at least part of the area to one or more other detected objects. Further, data indicative of one or more current environmental conditions in the area, such as weather conditions, temperature, pollution levels, may be obtained and inform selection of the delivery surface. The rule data may include one or more temporal criteria, and selection of the delivery surface may take account of a current time. Other relevant data that may inform selection of a delivery surface in the area include prior history of successful or unsuccessful delivery to the area and/or similar areas.

In at least one embodiment the sensor data may be used to obtain one or more characteristics of a plurality of candidate surfaces which may be used as a delivery surface at the second physical location and the delivery surface then selected from the candidate surfaces based on a comparison between the obtained one or more characteristics and the rule data.

Preferably the method comprises obtaining a specification of a delivery area at the designated second physical location, and, then, using the sensor data, identifying the area based on the delivery area specification. The specification may include a description of a delivery surface in terms of an object, such as "driveway", "balcony", "yard". The area may then be identified using an object model, in which case the area is identified using object recognition based on the object model. Suitable object models are accessible from third party sources and/or from a database that has been separately populated with e.g. three dimensional/wire frame data defining known objects. Alternatively the specification may include a description of a delivery surface in terms of a target image pattern, such as "crosshairs" of a particular configuration, differently reflecting materials, and the like. The area may then be identified using image pattern recognition based on the target image pattern. Suitable image patterns may also be accessible from third party sources and/or from a database, and may be defined in terms of e.g. colors, texture, materials of, and optically detectable codes located on, objects. As a further alternative the specification may include a target signal pattern, in which case the area is identified based on recognition of the target signal pattern. Examples include short range radio signals, which may be transmitted from beacons or similar, located at the area.

As regards the mechanics of payload delivery, the retractable delivery mechanism is attached to a main body of the UAV, and the retractable delivery mechanism includes a payload holder. The main body of the UAV has sensors thereon, used to obtain first sensor data, and the payload holder preferably also has one or more sensors, used to obtain second sensor data. The first and second sensor data may identify different respective first and second delivery surfaces. For example, use of the first sensor data may identify a first delivery surface, while use of the second sensor data may identify a second, different, delivery surface. In use, after the payload holder has been at least partly lowered by the retractable delivery mechanism, the second delivery surface may be selected as the delivery surface for payload delivery because the second sensor data is generated using sensors that are closer to the delivery surface, and thus may be expected to generate data that is more accurate than the first sensor data.

In some examples the second sensor data comprises a signal identified using at least one of Wi-Fi, Bluetooth and Infrared short range radio signals. This is particularly well suited to situations in which the delivery surface is intended to be identified via a transceiver transmitting e.g. a beacon.

As regards the mechanics of delivering to the delivery surface, the method involves obtaining data defining a descent cone defining an allowable range of three-dimensional positionings of the payload holder with respect to a position above the selected delivery surface; operating the retractable delivery mechanism to lower the payload holder from the main body towards the selected delivery surface; monitoring a current position of the payload holder with respect to the three-dimensional positionings defining the descent cone; and operating a propulsion system of the UAV to control a position of the payload holder with respect to the three-dimensional positionings defining the descent cone.

The propulsion system may comprise a propulsion sub-system attached to the payload holder, in which case the propulsion sub-system can apply a thrust force to the payload holder to adjust the position of the payload holder with respect to the descent cone, and thereby keep the payload holder on course for delivery of the payload to the selected delivery surface. Atmospheric conditions and/or obstacles located between the main body and the selected delivery surface may be detected and used to adjust the descent cone.

Embodiments described herein are particularly well suited to payload delivery to delivery surfaces for which there are characteristics and/or features that are defined via suitable said rule data, and which can be sensed using suitable said sensors of the UAV once the UAV has reached the second physical location, and during delivery of the payload using the retractable delivery mechanism and the payload holder. Examples include moving platforms, balconies, and generally surfaces that have particular shapes, patterns, texture and/or orientation.

In a second aspect of the present disclosure a payload delivery system is described, the payload delivery system comprising an unmanned aerial vehicle, the unmanned aerial vehicle comprising:
- a main body, the main body including:
  - a first propulsion system for altering a position of the main body, at least vertically, during flight,
  - a first propulsion controller for controlling the position of the main body during flight using the first propulsion system,
  - an extendable tether to be extended below the main body, and
  - a tether controller for controlling a state of extension of the extendable tether;
- a payload holder, connected to the extendable tether, for delivering a payload to a delivery surface when the main body is in flight, the payload holder comprising:
  - a second propulsion system for altering the position of the payload holder, at least horizontally, during payload delivery, and
  - a second propulsion controller for controlling the position of the payload holder during payload delivery using the second propulsion system; and
  - a payload holder monitor for obtaining current payload holder status data during payload delivery,
- wherein the payload delivery system is configured to:
  - receive delivery control data:
  - process the current payload holder status data in association with the delivery control data to generate payload holder propulsion control data; and
  - operate the second propulsion controller in accordance with the payload holder propulsion data.

Further features of embodiments are set forth below, and will be described with reference to the drawings.

DRAWINGS

FIG. 1B is a side view of an exemplary UAV facility that facilitates operation of a UAV as an automated package delivery vehicle;

FIGS. 8A-8D are schematic diagrams showing a sequence of illustrative views that are captured, for example, from an image capture device on the main body of a UAV as a payload is lowered towards a delivery surface according to an embodiment;

DESCRIPTION

Overview

Described herein are techniques for payload delivery from aerial vehicles such as drones that alleviate the problems associated with landing the aerial vehicle at a delivery site and therefore avoid many of the challenges described above. Specifically techniques are introduced for payload-based control of an aerial vehicle that autonomously maneuvers an aerial vehicle while lowering a payload (e.g., a removably tethered parcel payload) towards a delivery site while the vehicle remains in a safe position above the delivery site. As described herein, the term "autonomous" (including variations of this term) comprises fully-autonomous interactions (without interaction with a person during flight and/or delivery operations) and partially-autonomous interactions (with at least some interaction with a person during flight and/or delivery operations).

Figure 1A:
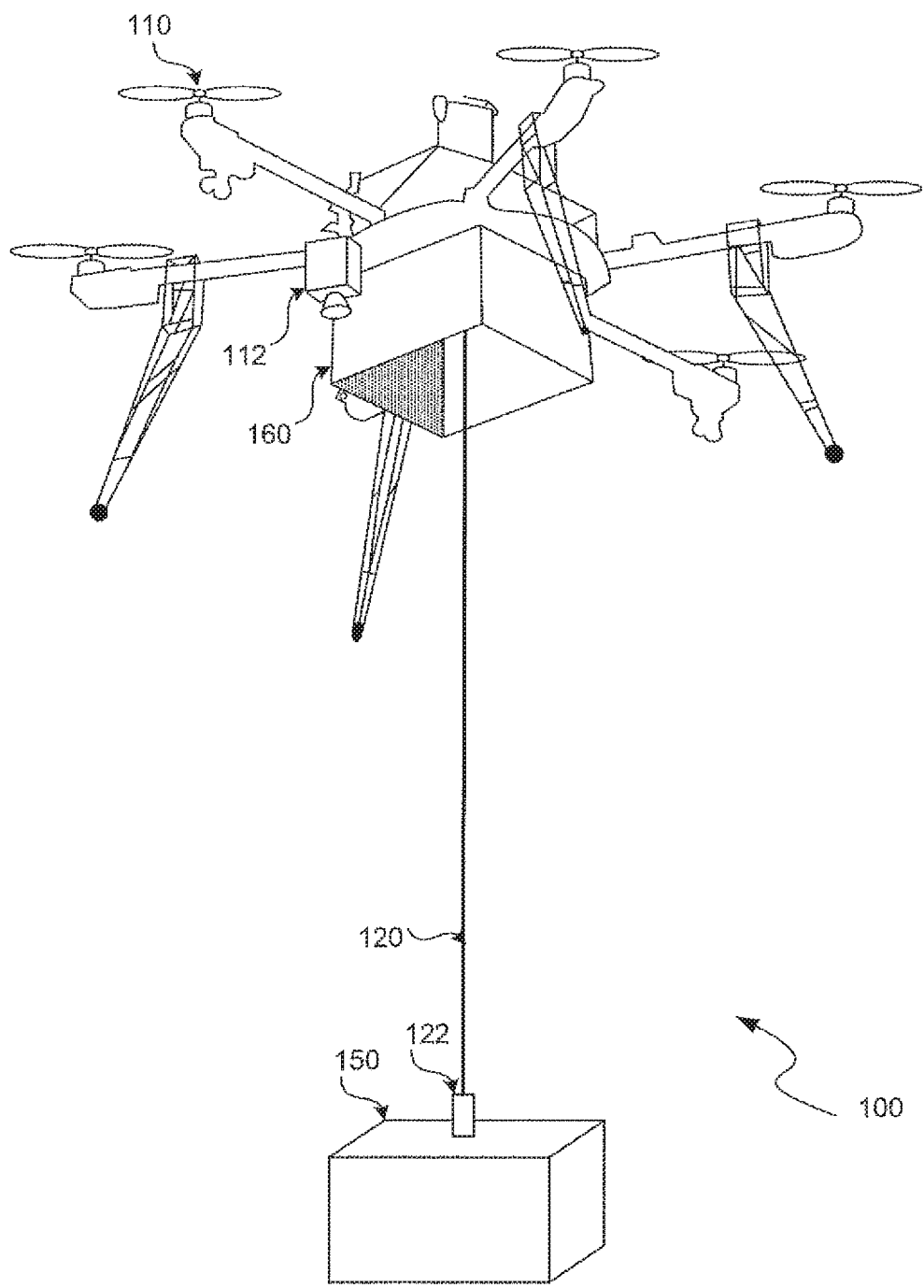
FIG. 1A is a schematic diagram of an example unmanned aerial vehicle ("UAV") operating as an automated package delivery vehicle, in accordance with some embodiments.

FIG. 1A is an illustration of an example unmanned aerial vehicle ("UAV") 100 operating as an automated package delivery vehicle, in accordance with some embodiments. As shown in FIG. 1, in some embodiments, UAV 100 may be a rotor-based VTOL aircraft. The example UAV 100 as shown in FIG. 1A may include one or more propulsion and control actuators 110 (e.g., powered rotors and/or aerodynamic control surfaces) for maintaining controlled flight, optical sensors in the form of an image capture device for automated navigation and flight control 112, other sensors (not shown) (e.g., for capturing audio), communications devices and systems (not shown) for communicating with other devices (e.g., a remote control device), for example via a wireless network connection, and a delivery system for securing, delivering, and releasing a payload 150. For example, as shown in FIG. 1, the delivery system of an example UAV 100 may include a retractable delivery mechanism 120 with a coupling mechanism 122 for coupling to the payload 150. Note that the delivery system is shown in FIG. 1A as including a single extendable/retractable cable or tether for illustrative purposes; however this is not to be construed as limiting. Other embodiments may include more than one cable coupled to the payload 150 or may employ a different type of mechanism capable of raising and lowering a payload 150. The payload cable may include power and/or signal wires to operate mechanisms at the end of the cable that can detachably couple to and release various payload types.

The delivery system may also include a securing mechanism 160 for securing the payload 150 in place while the UAV 100 is in flight. The securing mechanism 160 is shown in the example form of a compartment with multiple sidewalls within which the payload container 150 may securely fit when the cable mechanism 120 is fully retracted. In some embodiments, the sidewalls of the securing mechanism 160 may mechanically open and close to receive and/or release the payload 150. Again, securing mechanism 160 is shown in FIG. 1a as including sidewalls for illustrative purposes; however this is not to be construed as limiting. Other embodiments may include other types of securing mechanisms such as mechanical clamps or clips (including hook-loop mechanisms such as Velcro), magnets, adhesives, or any other systems or devices for temporarily securing the payload 150 to the main body of the UAV during flight. In some embodiments, the securing mechanism 160 may be integrated into the retractable delivery mechanism 120.

In some embodiments, the UAV 100 can autonomously fly to and pick up a payload 150 at a pickup location using the retractable delivery mechanism 120 and the coupling mechanism 122. Alternatively, the UAV 100 can collect the payload from a UAV facility 118 such as the one shown in FIG. 1B, comprising a housing with a roof 102, a base 104, and multiple side surfaces 110 located between the roof and the base to enclose the housing. In some embodiments, the housing may include wheels 111 to transport the housing, a jack 114 to level the housing, and a receptacle to attach to a vehicle (not shown). The UAV facility 118 may be modular and transportable, e.g., permitting the UAV facility 118 to be located and re-located at various different locations and customer premises. The payload 150 can be received into the UAV facility via ingress port 1004, accessible via opening 1010, and attached to the UAV 100 for delivery via a retractable tether such as the one indicated via parts 120, 122 in FIG. 1A. As the UAV 100 retracts the tether, the payload may be lifted towards the UAV, and may be stored within a compartment such as securing mechanism 160 shown in FIG. 1A during flight. The UAV facility 118 is communicably connected with one or more remote computing systems and thereby communicate with one or more remote servers and/or remote operators to transmit information about flight data, maintenance, security, etc.

The UAV 100 can then fly to a delivery location where it can then lower the payload by spooling out or extending the retractable cable and release the payload using the coupling mechanism 122 as is described in Applicant's patent application PCT/US2018/035657 entitled "Package Delivery Mechanism", the entire contents of which are incorporated herein by reference.

Mission Profile

Figure 2:
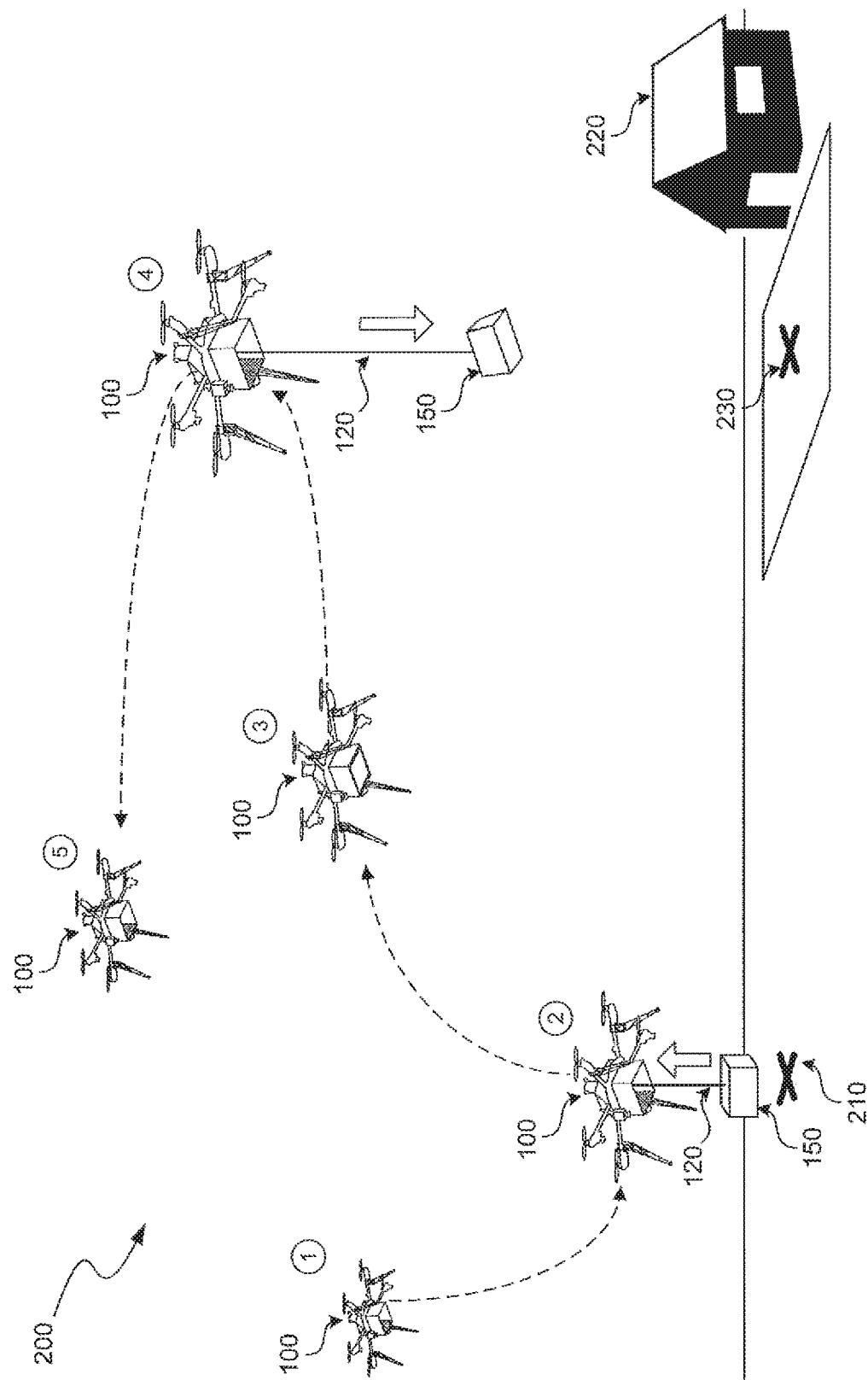
FIG. 2 is a diagram illustrating an example mission profile for delivering a payload by a UAV according to an embodiment.

FIG. 2 is a diagram illustrating an example mission profile 200 for delivering a payload 150 by a UAV 100. The techniques for payload-based automated control of a UAV are described herein in the context of an automated package delivery system similar to as shown in FIG. 2; however those with ordinary skill will recognize that such techniques can similarly be applied in other areas such as airborne search and rescue, mid-air refueling, UAV-assisted construction, or any other application requiring precise automated placement of an object from an aerial platform.

The example mission profile 200 begins at Phase 1 with a UAV 100 flying to a first location 210 (e.g., a pickup location) to then pick up and secure, at Phase 2, a payload 150 for delivery to a second location 220. The pickup location may be any location in the physical environment. In an embodiment, the pickup location 210 may be a distribution facility, for example, of a shipping and logistics company such as FedEx™, the United Parcel Service™, etc. The pickup location 210 may similarly be associated with a manufacturer, distributer, retailer, and/or any other type of vendor of products or services. In some embodiments, the pickup location may be a residential address (e.g., for a package return or individualized delivery).

In some embodiments, the UAV 100 may be configured for autonomous flight, or at least semi-autonomous flight, during Phase 1. Autonomous navigation during Phase 1 may be accomplished, for example, through the use of an autopilot or flight controller configured for use with an inertial navigation system. For example, observed positioning based on signals received at a global position system (GPS) receiver onboard the UAV 100 can be combined with data received from motion sensors (e.g., accelerometers, gyroscopes, inertial measurement units (IMUs)) onboard the UAV 100 to resolve an accurate position and/or orientation of the UAV 100 at any given time, relative to any given point of reference. These position and/or orientation estimates may be computed in real-time or near-real-time (e.g., within milliseconds) as the UAV 100 is in flight. In some embodiments, some or all of this data can further be combined with image data from onboard image capture devices though a technique called Visual Inertial Odometry (VIO).

In any case, Phase 2 involves the UAV 100 picking up and securing the payload 150 using a retractable delivery mechanism. For example, in an embodiment, the delivery mechanism includes a motorized retractable cable with some type of coupling mechanism configured to detachably couple to the payload 150. For example, the detachable coupling mechanism may include a mechanical coupling element, a magnetic coupling element, an adhesive coupling element, or may take the form described in Applicant's patent application PCT/US2018/035657 entitled "Package Delivery Mechanism", noted above.

Once coupled to the payload 150 using the coupling mechanism, the UAV 100 may retract the cable 120 with the attached payload 150 until the payload 150 is securely attached to the main body of the UAV. Alternatively, in some embodiments, the UAV 100 may descend to and collect the payload from ground level, for example, if the pickup location does not have any altitude or landing restrictions due to safety or noise concerns.

At Phase 3, with the payload secured, the UAV 100 flies to the second location 220. As with Phase 1, the UAV 100 may be directly or indirectly controlled by a remote human operator during Phase 3 while flying from the pickup location 210 to the delivery location 220. Alternatively, UAV 100 may autonomously or semi-autonomously navigate from the pickup location 210 to the delivery location 220. As a non-exhaustive list, the delivery location 220 may be any one of the following:

a fixed location that may be identified from geographic coordinates;
  a location relative or proximate to another location (e.g., a delivery location may be at or near the location of a smartphone; a delivery location may be within a specified distance from a known, identifiable and static object);
  a location that is in motion (e.g., a vehicle, object, or person in motion);
  a location that is set according to a street address;
  a location that is specified in natural language, such as "driveway", "balcony", "back yard" and the like, which can be entered by a user or selected from a predefined list of locations;
  a location that is identifiable via a discoverable object or beacon; and
  a location that is associated with a particular individual, a smartphone location (e.g., a location estimated by triangulating smartphone transmissions within a telecommunications system).

In one arrangement, as the UAV 100 picks up the payload 150 at Phase 2, it either scans (using an onboard sensor such as a camera) destination information from the payload 150 or some other object or label near the payload 150, or receives destination information via a set of instructions received e.g. from a central controller to determine the delivery location 220. When the delivery location is indicated in the form of a mailing address or mailing address barcode, the UAV 100 (or the central controller in communication with UAV 100) may determine a geographic coordinate that corresponds to the determined mailing address. As will be described, delivery at Phase 4 may require more precise positioning. However, during Phase 3, a rough geographic coordinate may be used to navigate (autonomously or otherwise) from the pickup location 210 to the delivery location 220.

As mentioned, Phase 3 may include remote controlled and/or autonomous flight by the UAV 100. In this example, the delivery location (e.g., as determined based on a mailing address) may be input into a navigation computer to generate a flight plan involving planned flight along one or more predetermined or ad hoc flight routes. In the case of remote controlled flight by a human operator, visual indicators associated with the generated flight plan can be displayed, via a display device, to the user, for example in the form of an interactive map with an overlaid flight plan. In the case of autonomous or semi-autonomous flight, a generated flight plan may include a series of waypoints that are fed into a flight controller. The flight controller may then generate control commands, in conjunction with an inertial navigation system, configured to cause the UAV 100 to fly to each waypoint along the generated flight path.

In some embodiments, an autonomous UAV may fly a direct route or substantially direct route towards the delivery location while automatically making adjustments along the way, for example to avoid traffic, terrain, weather, restricted airspace, etc. For example, to avoid traffic, UAV 100 may employ a traffic collision avoidance system (TCAS) based on radar, transponder signals from other aircraft, or any other technology configured to detect objects that present a collision risk. In an example embodiment, the UAV 100 may be configured to take one or more automated actions in response to receiving a TCAS alert (e.g., a traffic advisory or a resolution advisory). For example, the UAV 100 may begin actively scanning, using one or more sensors, for objects in the physical environment that present a collision risk. If, based on observable factors (e.g., range, type of alert, weather conditions, etc.), the risk of collision is determined to be above a certain threshold, the UAV 100 may automatically maneuver to avoid the collision. For example, the UAV 100 may make one or more predetermined evasive maneuvers (e.g., increase/decrease speed, increase/decrease altitude, change heading, etc.) before returning to the intended route once the TCAS alert is resolved. Note that TCAS refers to a specific set of systems well understood in the field of aviation. A person having ordinary skill will recognize that any type of collision avoidance or proximity detection system can similarly be implemented in an autonomous UAV to alleviate the risk of collision.

As shown in FIG. 2, in response to detecting that the UAV 100 is at the delivery location 220, a delivery phase (i.e., Phase 4) may begin. For example, the delivery phase may begin in response to detecting that the UAV 100 is within a threshold proximity (e.g., a predetermined radius) of the delivery location or a particular geographic coordinate (e.g., associated with a mailing address). In other examples, the delivery phase may begin in response to other events such as detecting that the UAV 100 has passed a certain waypoint, detecting that a certain amount of time has elapsed, detecting a control input from a remote human operator, etc. As will be described in more detail, the UAV 100 may then begin an autonomous delivery process that includes the techniques described in this disclosure for package-based control of the UAV 100. Specifically, in an embodiment, the UAV 100 may fly to and maintain a particular altitude over the delivery location 220, identify a delivery surface 230 at the delivery location, and automatically lower the payload to the delivery surface 230 using the retractable delivery mechanism 120.

The delivery surface 230 may be any appropriate surface (e.g., a roof, lawn, field, driveway, vehicle, balcony, boat etc.), or parts thereof, within a threshold proximity of the delivery location 220. For example the delivery surface 230 may be flat or not, may be oriented in parallel to the ground or at an angle, may be a certain distance above the ground, and/or may be stationary relative to the ground or mounted to a moving object (e.g., a landing platform on a boat at sea). In another embodiment, the delivery location 220 may require releasing or lowering the payload at a safe delivery location (e.g., the end of a driveway, to avoid contact with bystanders or other objects) such that the package, payload, or a part or component of the package or payload, or both, is conveyed or navigates (e.g., drives, rolls, moves, etc.) to a location near the delivery location 220 (e.g., a doorstep near the end of a driveway) to safely deliver the package. In this embodiment, upon delivering the package, the payload, or part or component of the payload, may move back to a safe pickup location (e.g., the end of a driveway) before the payload is reconnected and/or reunited with the UAV 100.

Embodiments described herein are particularly concerned with identifying the delivery surface 230 associated with the delivery location 220. This may involve accessing a set of rules, which define the characteristics of an appropriate delivery surface and take into account criteria such as type of delivery surface material, delivery surface area, delivery surface slope, distance of the delivery surface to a selected delivery location, proximity of the delivery surface to other detected objects (e.g., people, vehicles, animals, etc.), current or historical weather or other environmental conditions (e.g., temperature, sunlight, air pressure, precipitation, wind, etc.), prior history of successful or unsuccessful delivery (e.g., to delivery location, similar surfaces), or any other observed criteria. In some embodiments, the rules restricting the delivery surface may be governed by property lines, building schematics, local regulations, flight regulations, user preferences, or may be learned using trained or untrained machine learning models. In some embodiments, the delivery surface may be identified based on inexact instructions, for example, provided by a user that is shipping or receiving the payload. For example, in an embodiment, the system may be configured to receive a general shipping instruction such as, "deliver in the driveway". Using one or more delivery instructions combined with computer vision techniques, the UAV 100 (or a remote computing device in communication with UAV 100) may identify, based on e.g. images received from a downward facing image capture device 112 of the UAV 100 and/or other sensor devices, a delivery surface 230 that fits a criteria associated with the general instruction (e.g., the driveway at a particular address, a portion of a driveway free of obstacles, a landing pad or marker in proximity to a driveway, a balcony of a particular apartment etc.), within some threshold level of confidence.

The aforementioned rules may be associated with a database of objects, which may be populated using an object recognition system which is configured to learn from training data corresponding to shapes and sizes of known objects and terrains, labelled according to the type of object and characteristic surfaces thereof. Additionally or alternatively the database may be populated using data that may e.g. be sourced from third parties, which actively measure and characterize objects and surfaces thereof. Suitable algorithms that may be employed in image recognition include neural techniques or may be based on e.g. temporal correlation graphs. Statistical techniques such as Kalman Filters and Monte Carlo methods can also or alternatively be used. This enables matches to be made between the real-time output from the computer vision technologies deployed by the UAV and surfaces of candidate delivery surfaces 230 that correspond to specified delivery locations 220, as is described in more detail below.

As will be described, a flight controller may generate control data comprising one or more control commands configured to cause a UAV to adjust position and/or orientation based at least in part on images received from a downward facing image capture device 112. The control commands may be generated continuously, continually (e.g., regular or irregular time intervals), and/or in response to detected events. For example, in an embodiment, while maintaining a particular altitude, a flight controller of the UAV 100 may make fine adjustments to the lateral (i.e., horizontal) position of the UAV 100 based at least in part on one or more images received from the downward facing image capture device 112 that is capturing images of the payload 150 and the delivery surface 230 as the payload 150 is lowered towards the delivery surface.

In an embodiment, the UAV 100 may utilize the image capture device 112, alone or in combination with another monitoring device or sensor, with or without human or operator input, to detect and/or identify a safety hazard at the delivery location. In response to detecting and/or identifying a safety hazard at the delivery location, the UAV may 100 automatically or manually (through human or operator interaction) abort the delivery process. In another embodiment, in response to detecting and/or identifying a safety hazard at the delivery location, the UAV may 100 automatically or manually (through human or operator interaction) select a different delivery location.

In another embodiment, the UAV 100 may utilize the image capture device 112, alone or in combination with another monitoring device or sensor, with or without human or operator input, to identify a delivery recipient. For example, the image capture device 112 may take one or more images of a person receiving a package, or the package as-delivered. The image(s) taken by the image capture device 112 may be transmitted to a server so that delivery confirmation may be provided to an operator, a third-party operator, distributor, or other entity (e.g., delivery confirmation images may be provided to a shipping company responsible for delivering a package to a person or place). In an embodiment, timestamp or other personal, temporal, or geographic identifying information may be combined with or integrated into the image(s) captured by the image capture device 112 and/or provided to an operator, a third-party operator, distributor, or other entity.

At Phase 5, the UAV 100 at flies away from the delivery location 220 once the payload 150 is successfully delivered to the delivery surface 230. Depending on the implementation, the UAV 100 may return to the initial pickup location 210 or may continue on to a third location, and so on.

Figure 3:
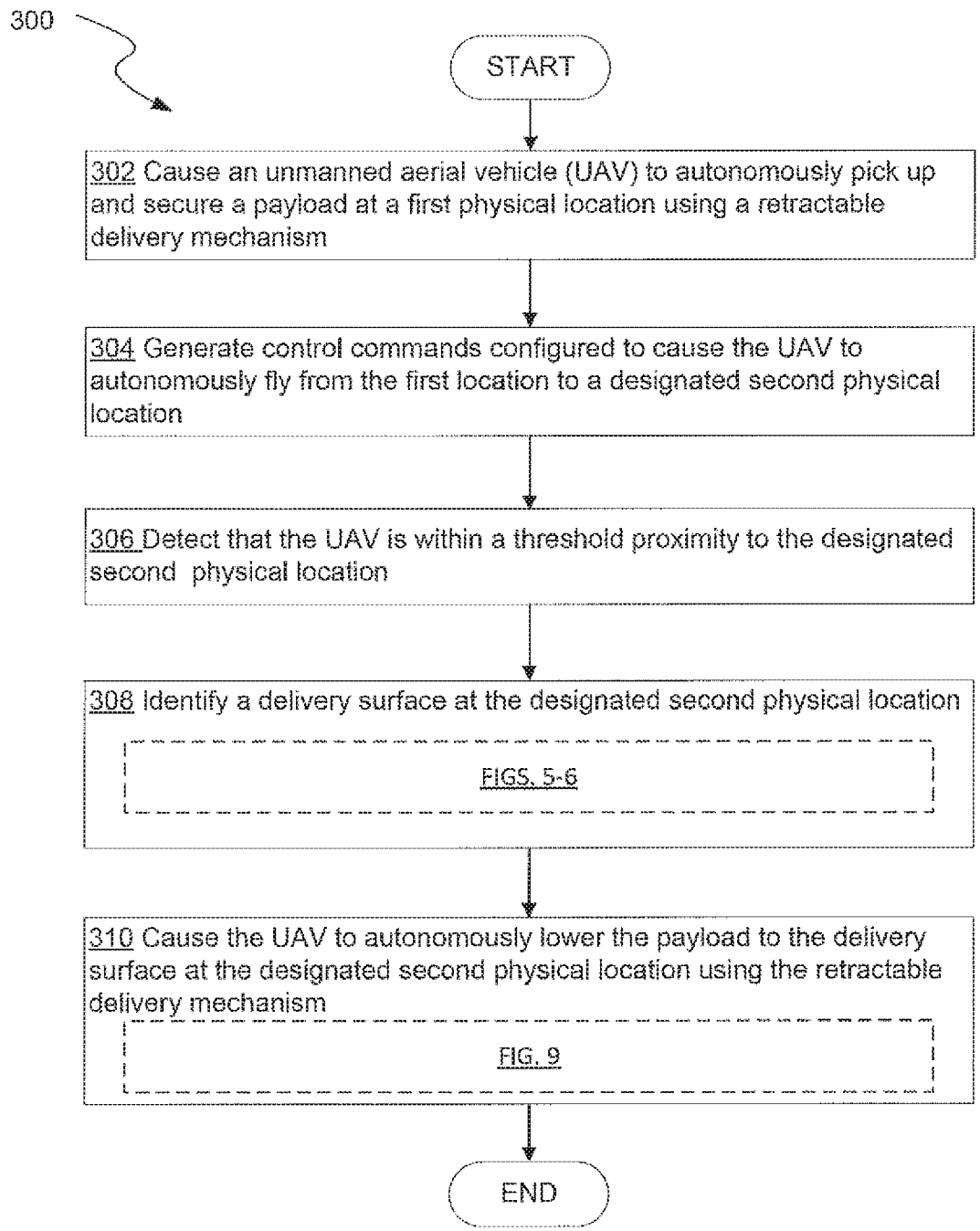
FIG. 3 is a flow diagram showing an example process for delivery of a payload by a UAV according to an embodiment.

Aspects of the mission profile described above are further described with respect to the flow chart in FIG. 3 that illustrates an example process 300 for autonomous delivery of a payload by a UAV. The steps of example process 300 may be performed by one or more computing device for example associated with the UAV system 1300 and/or computer system 1400 described with respect to FIGS. 13 and 14.

As shown in FIG. 3, example process 300 begins at step 302 with causing the UAV 100 to autonomously pick up, and secure a payload at a first physical location using a retractable delivery mechanism (see e.g., Phases 1 and 2 in FIG. 2).

The example process 300 continues at step 304 with generating control commands configured to cause the UAV 100 to autonomously fly from the first physical location to a designated second physical location (see e.g., Phase 3 in FIG. 2). Step 304 may include determining the designated second physical location. In some embodiments determining the second physical location may include receiving a location identifier such as a coordinate, mailing address, and/or location description. The location identifier may be electronically input by a user (e.g., a remote pilot of the UAV, a sender of the payload, a receiver of the payload, etc.). In other embodiments, the location identifier may be determined by, for example, scanning a label or radio frequency identification (RFID) tag associated with the payload to determining the location identifier. If the location identifier does not include a specific geographic location such as a coordinate, the step of determining the second physical location may further including comparing the location identifier against location data (e.g., a database relating mailing addresses to geographic coordinates) to determine a specific geographic location (e.g., geographic coordinate) to provide to a navigation system (e.g., flight controller 112).

The example process 300 continues at step 306 with detecting that the UAV is approaching within a threshold proximity of the designated physical location. This can be accomplished a number of ways. For example, a processing system may utilize signals from a GPS receiver onboard the UAV 100 while the UAV is in flight from the first location to the designated second location. Using these signals, the processing system can detect and/or estimate when the UAV 100 is within a particular or relative distance from the designated location. In some embodiments, where the designated second location has signal broadcasting capabilities (e.g., Wi-Fi™), a processing system may determine the proximity of the second location based on a received signal strength (RSS) or received signal strength indicator (RSSI) at the UAV 100. In some embodiments, a monitoring remote pilot may provide an input via a remote computing device that indicates that the UAV 100 is within a threshold proximity to the second physical location. A person having ordinary skill will recognize that the above mentioned examples represent only a few methods by which a processing system may determine when a vehicle in flight is within a threshold proximity of a designated physical location.

In response to detecting that the UAV 100 is within a threshold proximity of the designated second physical location, an autonomous delivery phase may begin. The autonomous delivery phase may include at step 308 identifying, confirming, or selecting a delivery surface at the designated second physical location, and at step 310 causing the UAV 100 to autonomously lower the payload 150 to the identified delivery surface using the retractable delivery mechanism. The example sub steps of steps 308 and 310 are described in more detail later with respect to the exemplary flow charts of FIGS. 5-6, and FIG. 9.

Payload-Based Control of the UAV Using Computer Vision

As previously discussed, some embodiments for payload-based automated control of a UAV, for example to deliver the payload to the ground are based on computer vision technology. For illustrative purposes, techniques are described below for applying computer vision based on "images" received from and/or determined by an "image capture device". It shall be appreciated that this is an example and is not to be construed as limiting. For example, computer vision techniques may also be applied by processing data from other types of sensors. For example, active range finding systems such as radar, sonar, and LIDAR may be used for imaging. In an embodiment, instead of capturing images using downward facing cameras, LIDAR may be used to scan the physical environment to produce real-time or near-real-time 2D or 3D "images" of the physical environment. Computer vision techniques for feature detection, feature tracking, and object recognition can similarly be applied to such imaging.

Figure 4:
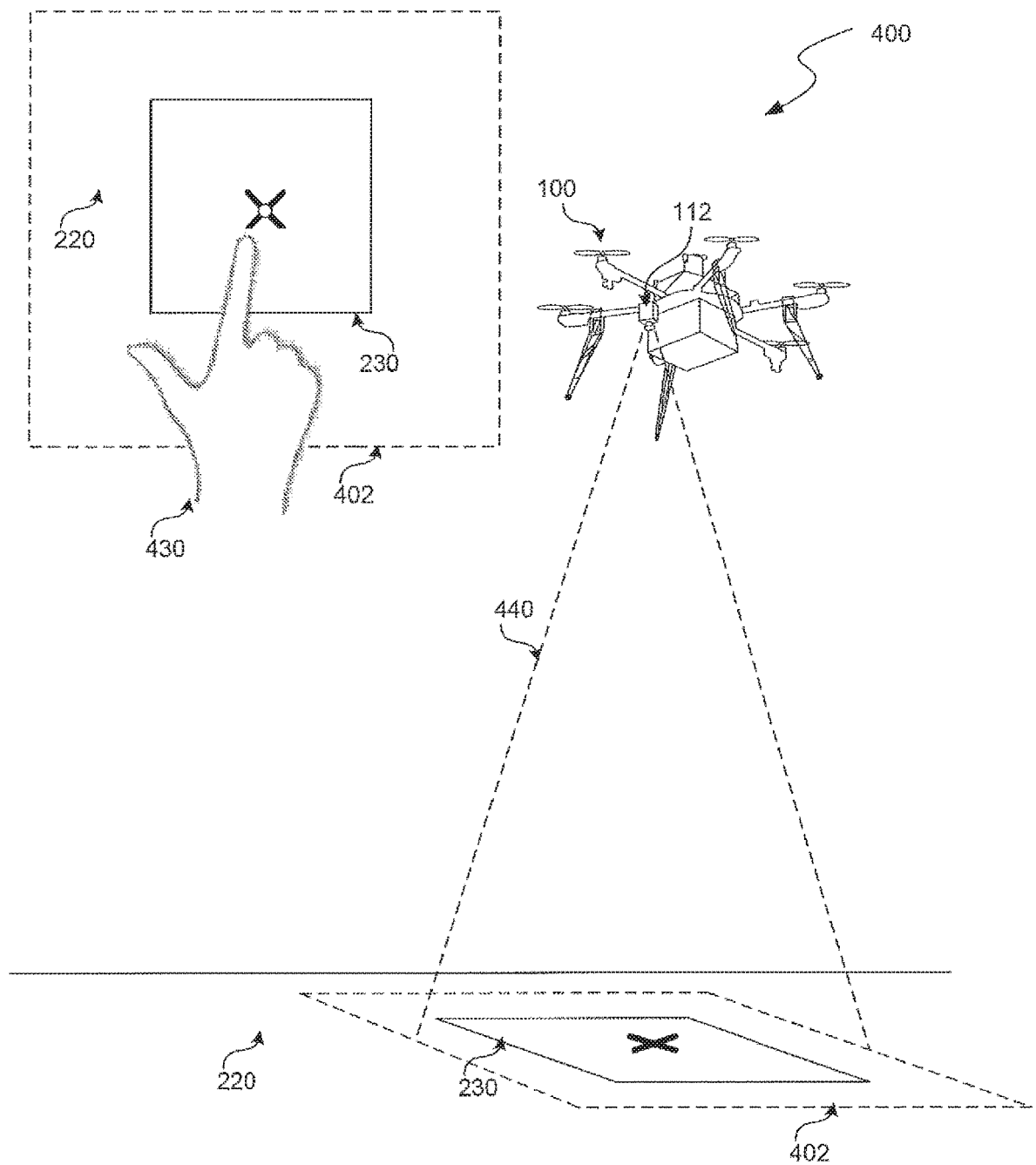
FIG. 4 is a schematic diagram showing an example method for identifying a delivery surface at a delivery location according to an embodiment.

FIG. 4 is an illustration describing an example method for identifying a delivery surface at a delivery location (e.g., Phase 4 in FIG. 2). As shown in FIG. 4, a UAV 100 is shown in flight over a physical environment at a designated second physical location 220. The UAV 100 may include one or more image capture devices such as the downward facing image capture device 112 shown in FIG. 4. The example image capture device 112 may include any type of optical sensor configured to capture images of the physical environment surrounding the UAV 100. In some embodiments the image capture device 112 is fixed in a downward facing orientation. Alternatively, the image capture device 112 can be affixed to a mechanical gimbal mechanism to allow for changes in orientation relative to the UAV 100. As another example, illustrative for object avoidance (e.g., urban deliveries around tall buildings), a UAV 100 may include additional image capture devices configured with various other orientations.

The image capture device 112 captures images of a field of view (FOV) in the physical environment as indicated in FIG. 4 by the dotted lines 440. A display of the FOV is represented by the dotted line box 402. For example, the dotted line box 402 may represent a live video feed from image capture device 112 as it is displayed at a display of a remote computing device (not shown) in wireless communication with UAV 100. As shown, the UAV 100 and associated image capture device 112 are capturing and/or transmitting images of a particular surface 230 in the physical environment at the designated delivery location 220. The particular surface 230 may be part of any physical object (e.g., a roof, driveway, lawn, table, vehicle, balcony, etc.) in the physical environment, but is illustrated in FIG. 4 as a basic shape along a plane of the ground for illustrative clarity.

In one arrangement images are captured using computer vision as noted above and analyzed by a processing system with reference to a database storing data indicative of various shapes, profiles and contours of objects in order to identify one or more suitable delivery surfaces 230.

Determining whether a delivery surface is suitable for payload-based automated delivery involves first identifying candidate delivery surfaces, using e.g. neural networks or statistical techniques as described above and secondly identifying, using the aforementioned rules, which of the candidate delivery surfaces are appropriate delivery surface(s). For example, rules may define the characteristics of a suitable delivery surface and take into account criteria such as type of delivery surface material, delivery surface area, delivery surface slope, distance of the delivery surface to a selected delivery location, proximity of the delivery surface to other detected objects (e.g., people, vehicles, animals, etc.), current or historical weather or other environmental conditions (e.g., temperature, sunlight, air pressure, precipitation, wind, etc.), prior history of successful or unsuccessful delivery (e.g., to the delivery location, similar surfaces, etc.), or any other observed criteria. In some embodiments, the rules controlling the delivery surface may be governed by property lines, building plans, local regulations, flight regulations, user preferences, or may be learned using trained or untrained machine learning models. Suitable delivery surfaces identified by the computer processing system may be indicated to a human operator 430 for example through interactive visual overlays in the display 402. The human operator 430 may then select one or more of the proposed delivery surfaces by interacting with the interactive visual overlays.

In some embodiments, a computer processing system may analyze a human-selected delivery surface and may elect to confirm, reject, or modify the selection based on certain criteria (e.g., characteristics of the human-selected delivery surface, environmental conditions, payload characteristics, etc.). For example, the processing system may scan (e.g., using computer vision and/or other sensing capabilities) the human-selected delivery surface to determine if it satisfies one or more of the aforementioned rules defining what qualifies as a suitable delivery surface. Alternatively, or in addition, the processing system may scan (e.g., using computer vision and/or other sensing capabilities) the physical environment surrounding a human-selected delivery surface to determine if sufficient maneuvering space is available to perform an automated delivery sequence.

If, based on this analysis, the processing system determines that the human-selected delivery surface is not suitable for payload-based automated delivery, the processing system may respond by any of rejecting the human-selected delivery surface, automatically selecting an alternative delivery surface near to the human-selected delivery surface that is suitable, or proposing an alternative delivery surface to the human operator 430, for example, as described above.

Figure 5:
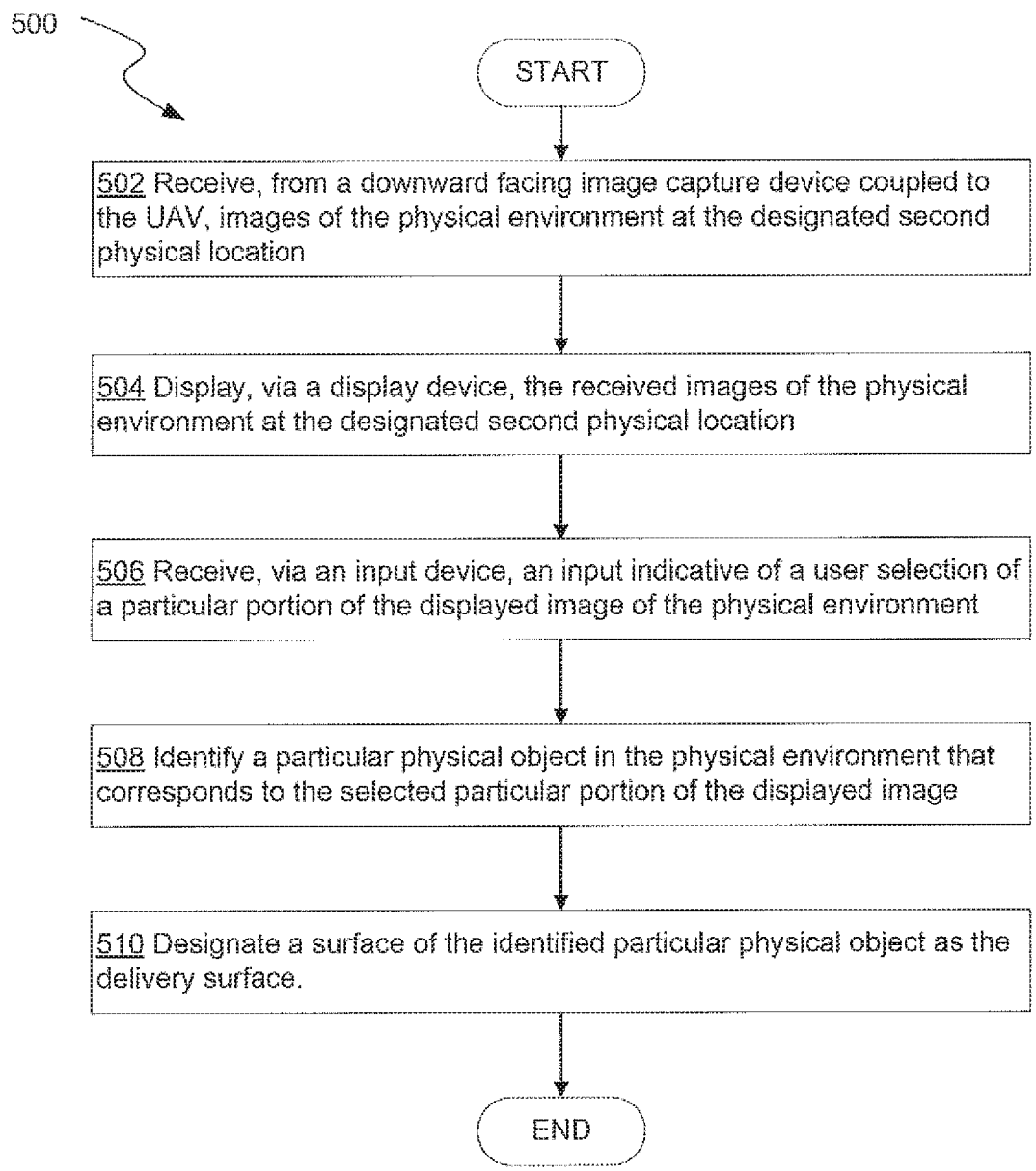
FIG. 5 is a flow diagram showing an example process for user selection of the delivery surface according to an embodiment.

FIG. 5 is a flow chart describing an example process 500 for user selection of the delivery surface, similar to as described above.

Example process 500 begins at step 502 with receiving, from an image capture device 112 coupled to a UAV 100, images of the physical environment at a designated delivery location 220.

At step 504, the images received from the image capture device 112 are displayed via a display device (e.g., as shown at display 402 in FIG. 4).

At step 506, an input indicative of a user selection of particular portion of the displayed image is received. For example, as described with respect to FIG. 4, a user may interact with a touch screen display by touching a particular portion of the display. In other embodiments, the user may be presented with one or more indicators of proposed delivery surfaces preselected by a processing system. For example, as mentioned, an interactive visual overlay may be displayed over a portion of the display corresponding to a proposed delivery surface. The user may then select one or more of the proposed delivery surfaces by interacting with the corresponding interactive visual overlays. The user may be allowed to select any delivery surface or may be restricted to selecting one or more of the proposed delivery surfaces by interacting with the corresponding visual indicators.

At step 508, the displayed image and the user selected portion are processed to identify a particular physical object in the physical environment that corresponds to the user selection. This step may involve use of one or more computer vision models, for example to detect features in the captured images and recognize objects corresponding to the detected features. In some embodiments feature detection and image recognition may employ one or more machine-learning based models. For example, computer vision algorithms may be used to identify the presence of a physical object in the FOV of the image capture device 112 and identify the object as belonging to a known object type with particular physical characteristics. In such embodiments, an object may be identified by comparing the captured image to stored two-dimensional (2D) and/or three-dimensional (3D) appearance models, or other object representative data. In some embodiments the 2D and/or 3D appearance models may be represented as a trained neural network that utilizes deep learning to classify objects in images according to detected patterns. In some embodiments, a processing system may utilize data from other sensors such as motion sensors (e.g., accelerometers, gyro, inertial measurement unit (IMU), etc.) and proximity sensors to resolve a location and/or orientation of the identified particular physical object relative to the UAV 100. For example, by applying VIO to a sequence of several images capturing the particular physical object, a position and/or orientation of the physical object relative to the image capture device 112 (and by extension the UAV 100) can be resolved.

At step 510, a particular surface of the identified particular physical object may be identified and designated as the delivery surface 230 for the purpose of initiating an autonomous delivery sequence. Again, similar to identifying a physical object, computer vision algorithms may be applied to the captured images to identify specific surfaces of the identified objects. For example, a picnic table identified in the physical environment may include a number of surfaces such as the table top and the bench tops. Accordingly, step 510 may involve processing the identified surfaces of the selected physical object against certain rules (e.g., material, area, orientation, etc.) to identify a particular surface that is suitable to receive the payload 150 given certain characteristics of the payload (e.g., weight, dimensions, etc.). For example, if a human operator selects the aforementioned picnic table, the processing system may take the user's selection and identify the table top of the selected picnic table as the only appropriate delivery surface given the weight and dimensions of the payload 150. Accordingly, the table top can then be designated as the delivery surface 230 and the delivery sequence initiated.

Step 510 may additionally include analyzing the user-selected delivery surface to confirm, reject, or modify the selection based on certain criteria (e.g., characteristics of the user-selected delivery surface, environmental conditions, atmospheric conditions, payload characteristics, etc.). For example, this process may include scanning (e.g., using computer vision and/or other sensing capabilities) the user-selected delivery surface and surrounding area to determine if it satisfies one or more of the aforementioned rules defining what qualifies as a suitable delivery surface.

Figure 6:
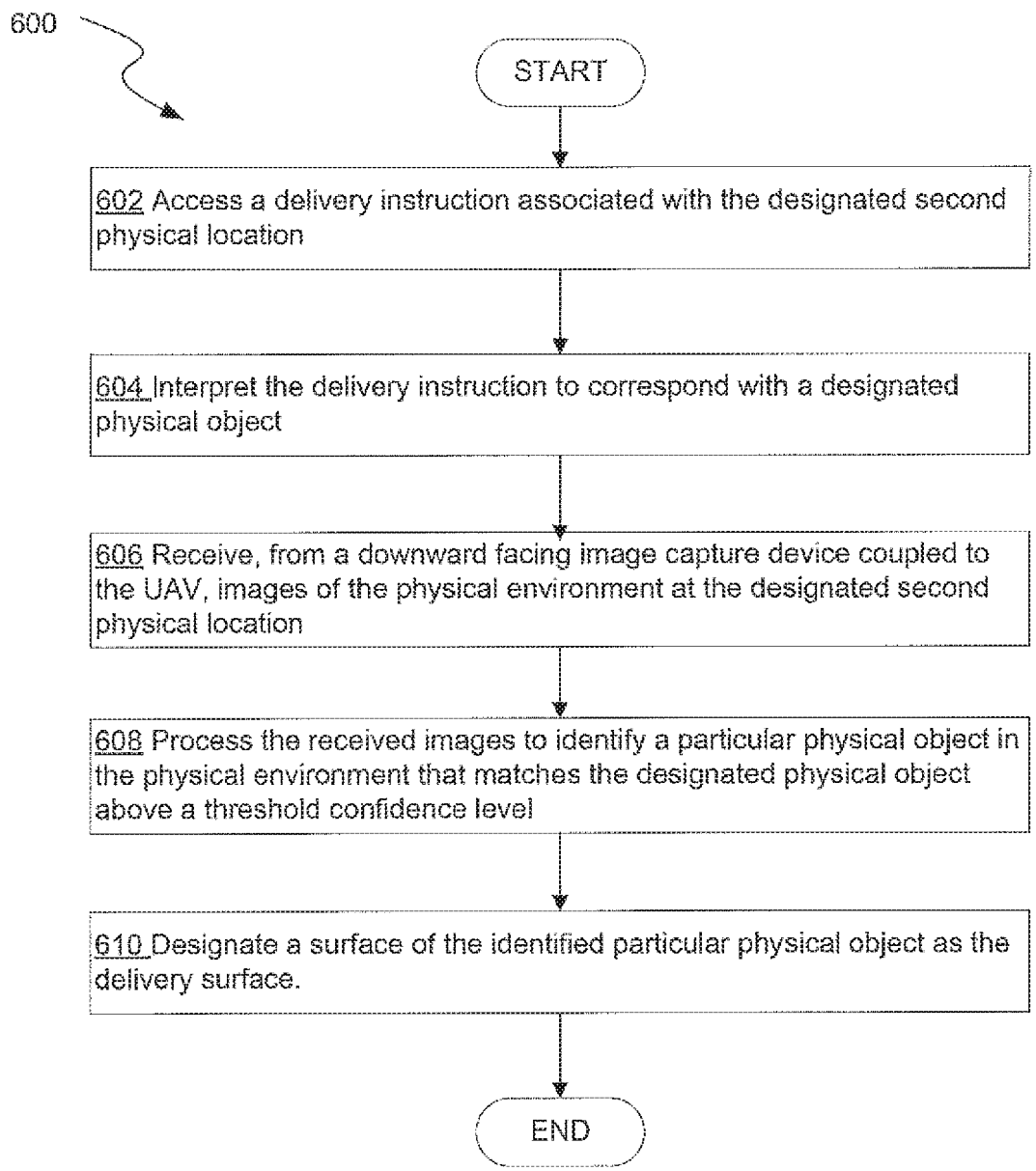
FIG. 6 is a flow diagram showing an example process for automated selection of the delivery surface according to an embodiment.

In some embodiments, the process of identifying a delivery surface may be performed automatically by a processing system without any input from a human user. FIG. 6 is a flow chart describing an example process 600 for automated selection of the delivery surface.

Example process 600 begins at step 602 with processing one or more delivery instructions associated with the designated delivery location. For example, recall that a delivery instruction may include a location identifier such as a mailing address as well as a related supplemental instruction or comment such as "deliver in the driveway". This supplemental instruction may be input by a user via a computing device at any time prior to and including arrival at the delivery location. Consider for example a scenario involving an online order by a consumer user. In finalizing the online order, the consumer user may include a comment such as "deliver in the driveway", or select "driveway" from e.g. a dropdown list, which will then be used by a processing system onboard the UAV 100 and/or in communication with the UAV 100 to identify and designate a delivery surface 230. In some embodiments, the accessed instructions may include criteria associated with one or more rules or regulations. For example, a given municipality may include a regulation that limits the airborne delivery of packages to certain surfaces such as driveways e.g. at particular times of the day, and excludes delivery to surfaces such as roofs.

In any case, at step 604, the accessed one or more delivery instructions are interpreted to correspond with a designated physical object. For example, consider again the plain language instruction to "deliver in the driveway". In an embodiment, natural language processing may be applied to parse the string "deliver in the driveway" and to interpret an intent that the payload be delivered in a "driveway" near the delivery location. The term "driveway" can then be associated with one or more known and/or classified physical objects that may be tracked in a database. For example, the term "driveway" can be associated with a number of similar or related terms such as "garage", "road", "front yard", "cement", "entrance", etc.

At step 606, images of the physical environment at the designated delivery location 220 are received from the image capture device 112 coupled to the UAV 100. Step 606 may involve processes similar to step 502 in FIG. 5.

At step 608, the received images are processed identify any instances of physical objects that match the designated physical object (determined at step 604), for example, above a threshold confidence level. As with step 508 in FIG. 5, step 608 may involve use of one or more computer vision models, for example, to detect features in the captured images and recognize objects corresponding to the detected features. In some embodiments, feature detection and image recognition may employ one or more machine-learning based models. For example, computer vision algorithms may be used to identify the presence of a physical object in the FOV of the image capture device 112 and identify the object as belonging to a known object type with particular physical characteristics. In such embodiments, an object may be identified by comparing the captured image to stored 2D and/or 3D appearance models. In some embodiments the 2D and/or 3D appearance models may be represented as a trained neural network that utilizes deep learning to classify objects in images according to detected patterns. In some embodiments, a processing system may utilize data from other sensors such as motion sensors (accelerometers, gyro, IMU, etc.) and proximity sensors to resolve a location and/or orientation of the identified particular physical object relative to the UAV 100. For example, by applying VIO to a sequence of several images capturing the particular physical object, a position and/or orientation of the physical object relative to the image capture device 112 (and by extension the UAV 100) can be resolved.

In some situations, the processing system may not be able to identify a physical object in the captured images that corresponds to a given delivery instruction. Accordingly, for any physical objects identified and recognized in the captured images through computer vision, a processing system may compare the features of the identified physical objects to 2D and/or 3D appearance models of one or more physical objects designated based on the delivery instructions. Consider again the instruction to deliver at a "driveway". Based on this instruction, the processing system may access a database of appearance models that correspond in some way to a "driveway". In comparing features, the processing system may generate a measure indicative of a level of confidence in the match. Generation of such a measure can be weighted in a number of ways based on comparisons of certain features. A level of confidence may be represented several different ways. For example, the level of confidence may fall within one of several categories (e.g., high, medium, low, etc.) or may be represented quantitatively, for example, as value on a defined scale. For example, confidence may be ranked on a scale of 0 to 1, with 0.0 to 0.4 indicating low confidence, 0.5 to 0.8 indicating medium confidence, and 0.9 to 1.0 indicating high confidence.

If the processing system is still unable to identify a physical object corresponding to the delivery instruction, the processing system may prompt a human user (if available) for assistance. For example the processing system may revert to a user selection process similar to as described with respect to FIG. 5. In some embodiments, user inputs received in response to a prompt for assistance may be utilized to train one or more machine learning models to improve future automated adherence to delivery instructions.

At step 610, a particular surface of the identified particular physical object may be identified and designated as the delivery surface 230 for the purpose of initiating the autonomous delivery sequence. Again, similar to identifying a physical object, computer vision algorithms may be applied to the captured images to identify specific surfaces of the identified objects. For example, a picnic table identified in the physical environment may include a number of surfaces such as the table top and the bench tops. Accordingly, step 610 may involve processing the identified surfaces of the selected physical object against certain criteria (e.g., material, area, orientation, etc.) to identify a particular surface that is appropriate to receive the payload 150 given certain characteristics of the payload (e.g., weight, dimensions, etc.). For example, if a user operator selects the aforementioned picnic table, the processing system may take the user's selection and identify the table top of the selected picnic table as the only appropriate delivery surface given the weight and dimensions of the payload 150. Accordingly, the table top can then be designated as the delivery surface 230 and the delivery sequence initiated.

Figure 7A:
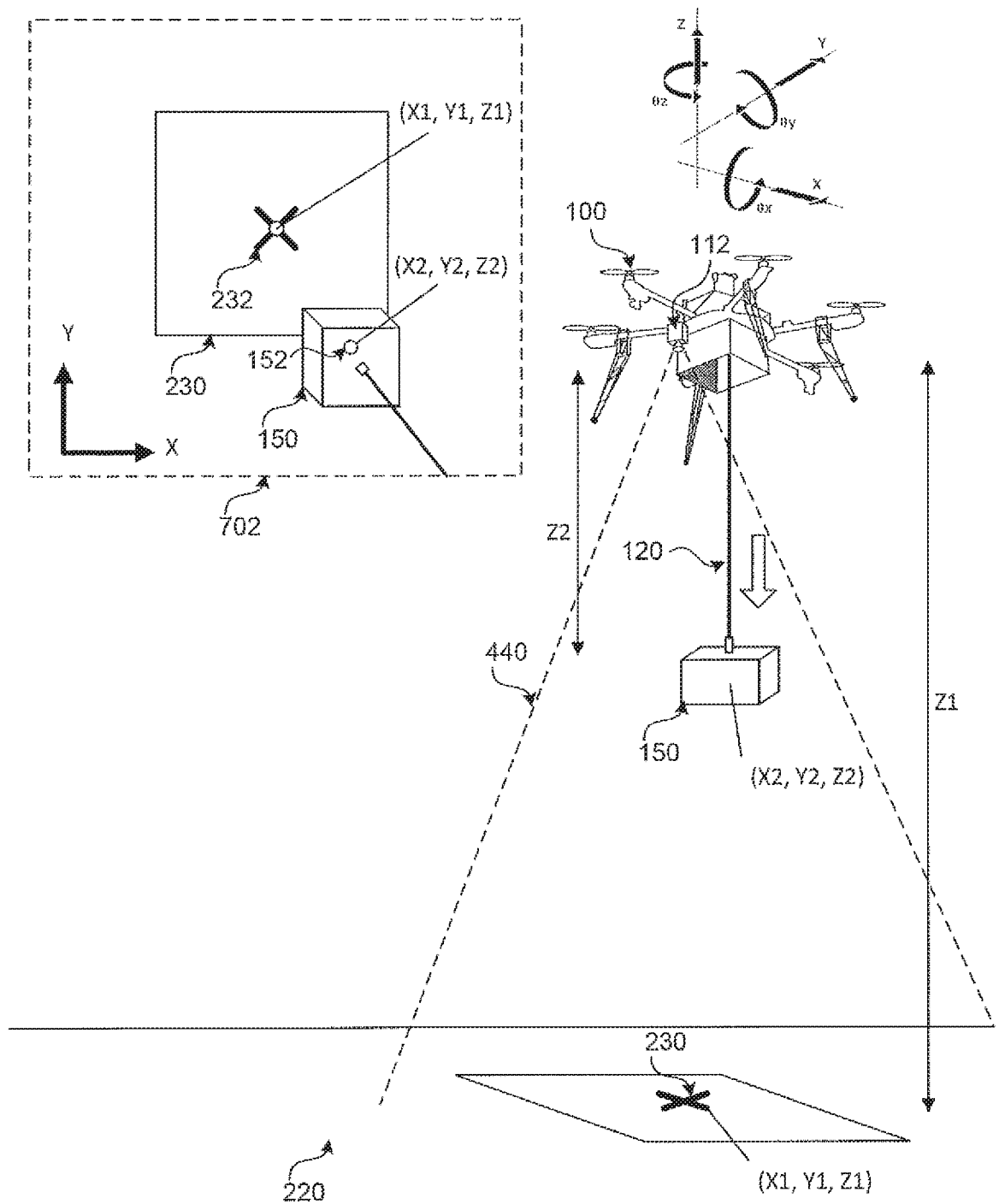
FIG. 7A is a schematic diagram showing a view of the payload and/or the designated delivery surface, as captured in a field of view, according to an embodiment.
Figure 7B:
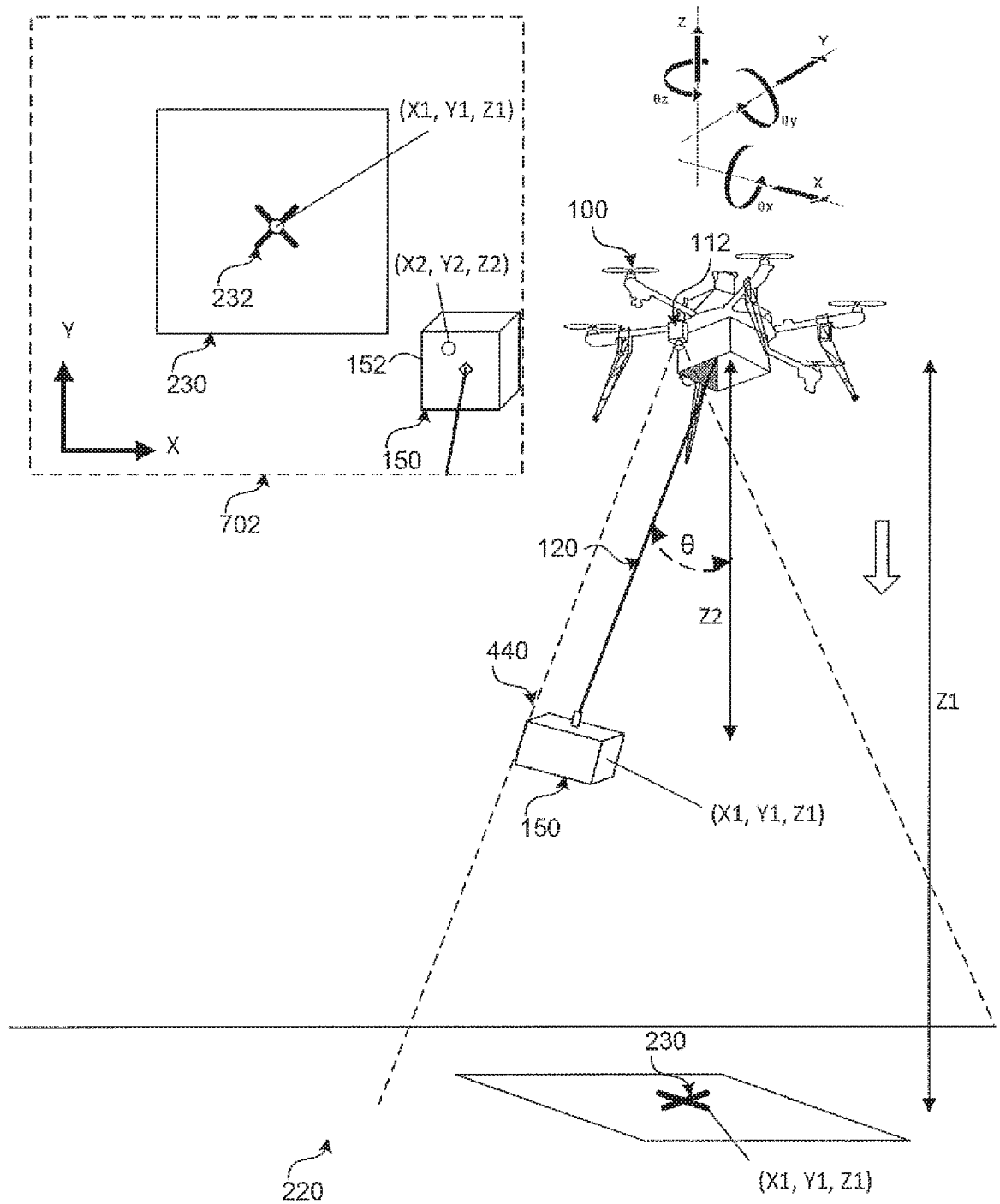
FIG. 7B is a schematic diagram showing a further view of the payload and/or the designated delivery surface, as captured in a field of view, according to an embodiment.
Figure 7C:
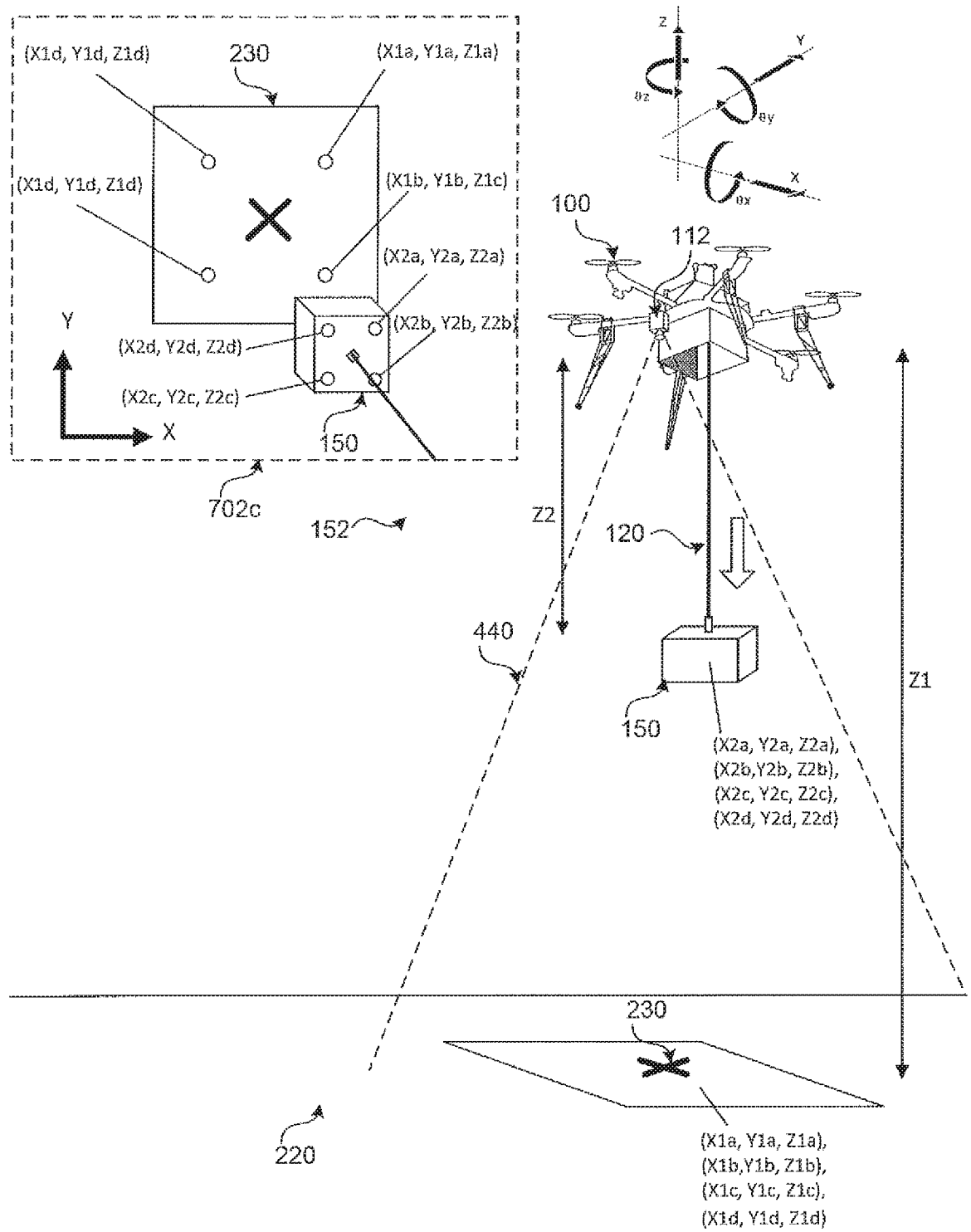
FIG. 7C is a schematic diagram showing a yet further view of the payload and/or the designated delivery surface, as captured in a field of view, according to an embodiment.

FIGS. 7A-7D illustrate example techniques for estimating positions and/or orientations of various objects (e.g., UAV 100, payload 150, and delivery surface 230) during the delivery sequence (see e.g., Phase 4 in FIG. 2). As shown in FIGS. 7A-7C (and similar to FIG. 4), a UAV 100 is shown in flight over a physical environment at a designated second physical location (i.e., delivery location) 220. As previously mentioned, UAV 100 may include one or more image capture devices such as the downward facing image capture device 112. Note that the estimation of positions and orientations is described with respect to FIGS. 7A-7D, however it shall be appreciated that certain derivative values (e.g. vectors) based on rates of changes of these estimations (e.g., linear velocity, linear acceleration, angular velocity, angular acceleration, etc.) can similarly be estimated and tracked.

The solution for autonomously delivering a payload 150 to a particular or proximate point on the ground may involve measuring, estimating, testing, confirming, and/or adjusting for the positions and orientation of multiple objects, specifically at least the UAV 100, the payload 150 being lowered, and the delivery surface 230 upon which the payload 150 will be set. Additionally, the solution may involve measuring, estimating, testing, confirming, and/or adjusting for multiple points of reference on each tracked object (e.g., the payload 150, the delivery surface 230, or other objects within a particular proximity of the delivery location 220). A person having ordinary skill will recognize that there are a number of different ways in which the positions and/or orientations of objects can be estimated, for example, based on data received from various sensors onboard the UAV 100, the payload 150, or elsewhere. As will be described in more detail, techniques are introduced herein that utilize computer vision specifically (but not necessarily exclusively) to estimate the positions of the payload 150 and delivery surface 230 relative to the UAV 100 and to use this information to autonomously maneuver the UAV 100 as the payload 150 is lowered such that payload 150 is placed on or at least near the designated delivery surface 230.

In an example scenario depicted in FIG. 7A, a view 702 of the payload 150 and/or the designated delivery surface 230 is captured in a FOV (illustrated as dotted lines 440) of the downward facing image capture device 112 mounted to the UAV 100. In some embodiments positions/orientations of each of the components of the dynamic system (i.e., UAV 100, payload 150, and delivery surface 230) may be estimated and tracked over time to inform a controller (e.g., onboard the UAV 100) for generating control commands configured to maneuver the UAV 100. In a hypothetical processing system with unlimited computing resources this may involve utilizing sensor data from multiple sensors (e.g., optical, proximity, motion, etc.) to estimate and track absolute global positions and orientations (e.g., in Cartesian coordinates) of each of the relevant components (e.g., UAV 100, payload 150, and delivery surface 230). However, this may be computationally expensive and may not practical if, for example, position/orientation estimates are to be calculated by a processing system onboard the UAV 100. Instead, the scenario illustrated in FIG. 7A describes a method that simplifies the positional estimations using certain assumptions.

As previously described, in some embodiments, as soon as the UAV 100 arrives at the delivery location 220 and identifies a delivery surface 230 it may enter and maintain a hover at a particular altitude (e.g., 20 meters). Like any aircraft, UAV 100 may include an onboard air-pressure based altimeter for measuring the altitude of the craft at a given time. Resolving the actual flight level above the ground at any geographic location based on an altimeter reading is well understood in the art. In some embodiments, UAV 100 may also or alternatively include proximity (or range finding) sensors such as LIDAR or a radio altimeter to get precise readings on the vertical position of the UAV 100 above the ground or specifically the delivery surface 230. Further in some embodiments the image capture device 112 can be utilized to estimate the vertical distance of the UAV 100 above the ground. For example, in some embodiments the image capture device 112 may include a stereoscopic camera. Images of the same object captured at slightly different positions using a stereoscopic camera can be used to estimate a distance to that object. Similarly, even if image capture device 112 does not include stereoscopic capabilities, sequences of images captured at different times can be utilized to estimate positional information about objects captured in the images by applying the same principle. This can be further supplemented with data from other sensors onboard the UAV 100 (e.g., accelerometers, gyroscopes, IMU, etc.) to resolve the position/orientation of the image capture device 112 at any given time using VIO.

Depending on the situation, the measured vertical height of the UAV 100 above the ground can be utilized as an estimated vertical distance Z1 between the UAV 100 and the delivery surface 230 (e.g., where the delivery surface 230 is in a field, driveway, or some other flat surface on the ground). However, this assumption may not apply in all situations. For example, if the delivery surface is on the roof of a building, a balcony, or on a moving body (e.g., a boat or car) where the vertical distance Z1 may vary, more precise measurements (e.g., using LIDAR and/or visual odometry) may be necessary.

Any of the above described methods for estimating the vertical position of the delivery surface 230 relative to the UAV 100 can similarly be applied to estimating the vertical position Z2 of the payload 150 relative to the UAV 100. For example, as shown in view 702, as the payload 150 is lowered towards the delivery surface 230, the image capture device 112 and or other sensors such as LIDAR (light detection and ranging) may be used to estimate and track the vertical separation distance between the payload 150 and the UAV 100. This estimation can also be greatly simplified by relying on a particular constraint in the illustrated dynamic system, namely that until the payload 150 contacts the delivery surface 230, the vertical distance between the UAV 100 and payload 150 is roughly equivalent to the length of the cable 120 deployed from the retractable delivery mechanism. For example, the delivery mechanism may include a motorized cable spool configured to let out the cable 120 and retract the cable 120 in response to control commands, for example from a flight controller. The length of cable 120 deployed from the motorized cable spool can be estimated at any given time based on a rotational position of the motorized cable spool, for example, using a rotational encoder device.

Of course the actual virtual distance Z2 between the UAV 100 and payload 150 may depend on the angle of the cable 120 deployed from the UAV 100. For example, FIG. 7B illustrates a scenario similar to as described in FIG. 7A, except that the payload 150 is deflected to one side of the UAV 100 such that the cable 120 is no longer oriented perpendicular to the ground. This angle 8 can fluctuate due to atmospheric factors such as wind and due to the inertia of the payload 150 countering acceleration by the UAV 100. Depending on the implementation, such fluctuations can either be ignored or accounted for in the vertical distance estimations. For example, the actual vertical distance Z2 between the UAV 100 and payload 150 can be resolved based, for example, on the length of cable 120 deployed along with an estimated lateral (i.e., X-Y or horizontal) position of the payload 150 relative to the UAV 100 and/or an estimated angle θ of the cable 120 relative to the gravity force vector. In an embodiment, a lateral (i.e., horizontal) position of the payload 150 relative to the UAV 100 may be estimated using computer vision, for example, as described below. In another embodiment, data from motion sensors (e.g., an IMU) onboard the payload 150 and/or UAV 100 may be used to estimate positional offsets. Such techniques may similarly be applied to estimate the angle of the cable 120 relative to the ground.

As previously discussed, the positions and relative displacements (including lateral or horizontal positions and displacements) of the delivery surface 230 and payload 150 relative to the UAV 100 can be estimated using a number of different techniques. As illustrated in FIG. 7A, in at least some embodiments, lateral (i.e., horizontal) positions are estimated at least using images captured by the image capture device 112. For example, as shown in view 702, both the delivery surface 230 and payload 150 may be captured as the payload 150 is lowered towards the delivery surface 230. Using computer vision techniques, the two objects are tracked as they move within the 2D view space of the captured view 702. For example, positions within the view space may be defined according to Cartesian coordinates X and Y, as shown in detail FIG. 7A Given a fixed position of the image capture device 112 relative to the UAV 100, the X-Y position of each object within the view space 702 can be understood to correspond to a lateral (i.e., horizontal) position of the object relative to the UAV 100. It shall be appreciated that the image capture device 112 need not be stationary in all embodiments. For example, in some embodiments, the image capture device may be articulated using a gimbal mechanism, for example, for image stabilization. In such cases, the lateral (i.e., horizontal) position of a captured object may be resolved using orthorectification to account for the change in orientation of the image capture device 112 relative to the UAV 100.

In some embodiments, the estimated lateral (i.e., horizontal) position of an object captured by the image capture device 112 may be based on a particular point relative to the object itself. For example, as shown in view 702 the lateral (i.e., horizontal) position of the delivery surface is based on a coordinate (X1, Y1) of a point 232 relative to the captured image of the delivery surface 230. Similarly, the lateral (i.e., horizontal) position of the payload 150 is based on a coordinate (X2, Y2) of a point 152 relative to the captured image of the payload 150. The points 232 and 152 upon which the lateral (i.e., horizontal) positions of the represented objects are based may be set using different techniques. For example, in some embodiments, the points may be based on tracked features in the captured images. For example, in an embodiment, the payload 150 may include some sort of visual indicator (e.g., a marking or symbol) that is recognizable by a system processing captured images. The tracked feature of the payload 150 may then be resolved as indicative of the position of the payload 150 in the captured images. In some embodiments, the position of objects may be based on the pixels representing the object in the captured images. For example, given a set of pixels falling within a boundary of a recognized object such as payload 150, the (X2, Y2) position of payload 150 may be defined as the position of a pixel representing an average position of the set of pixels. For example, the pixel having this average position may reside at or near a centroid of a geometric object defined by the boundaries of the identified physical object represented in the captured images.

Accordingly, in some embodiments, the lateral (i.e. horizontal) positions of the delivery surface 230 and payload 150 are estimated based on the respective positions of certain pixels in images (e.g., represented by view 702) captured via the image capture device. The goal of placing the payload 150 onto the delivery surface 230 can therefore be simplified. Specifically, the goal may be defined as adjusting the position of the UAV 100 (and by extension the image capture device 112) such that the (X2, Y2) coordinate of the tracked point 152 (representing payload 150) is at or near the (X1, Y1) coordinate of the tracked point 232 (representing delivery surface 230) by the time the vertical position Z2 of the payload 150 equals or substantially equals the vertical position Z1 of the delivery surface 230 (i.e., when the payload 150 is in contact with the delivery surface 230).

In some embodiments, two or more positions may be estimated and tracked for any of the UAV 100, the payload 150, and/or the delivery surface 230. FIG. 7C shows an example scenario similar to that depicted in FIG. 7A except that four positions are estimated for both the payload 150 and delivery surface 230. As shown in view 702c in FIG. 7C, the positions of four points of reference corresponding to the delivery surface are estimated (e.g., using any of the above described techniques) and tracked. Specifically, coordinates (X1a, Y1a, Z1a), (X1b, Y1b, Z1b), (X1c, Y1c, Z1c), (X1d, Y1d, Z1d) for four points corresponding to the delivery surface 230 are estimated along with coordinates (X2a, Y2a, Z2a), (X2b, Y2b, Z2b), (X2c, Y2c, Z2c), (X2d, Y2d, Z2d) for four points corresponding to the payload 150.

Estimating positions for more than one indicative point for a given object in the physical environment may require increased processing resources, but may yield more accurate position and/or orientation estimates. For example, by estimating and tracking more than one position per object, a relative orientation of that object may be resolved with respect to the UAV 100 or the delivery surface 230. Consider an example, in which the payload 150 begins spinning during the delivery sequence. If only one indicative position of payload 150 is estimated and tracked (e.g., as illustrated in FIG. 7A), it may be difficult to detect the spinning and perform a corrective maneuver if necessary. Conversely, if two or more positions are estimated and tracked the spinning can be detected based on changes in the multiple positions relative to the image capture device onboard the UAV 100. Similarly, tracking multiple points relative to an object may allow for estimation of an orientation of the object. For example, by estimating 3D positions of the four points of reference along the delivery surface 230 (as depicted in FIG. 7B) an orientation of the delivery surface 230 relative to the UAV 100 may be resolved. This relative orientation of delivery surface 230 may, for example, indicate that the delivery surface is on a slope and not perpendicular to the gravity force vector.

Estimates for the positions and/or ordinations of various objects such as the UAV 100, payload 150, or delivery surface 230 may be calculated continuously, continually (i.e., at regular or irregular intervals), intermittently, and/or in response to detected events or environmental conditions. For example, to save processing resources and thereby battery power, a system may be configured to vary the rate at which positional estimates are made depending on how close the payload 150 is to the delivery surface 230. In an embodiment, a system may continually perform positional estimates at a lower rate early in the delivery sequence (i.e., when the payload 150 is beginning to be lowered) when fine positional adjustments are not needed. The system may then increase the rate at which positional estimates are made as the payload 150 approaches the delivery surface 230 when fine positional adjustments may be needed.

As previously mentioned, the goal during the delivery sequence is to align the tracked lateral positions of the delivery surface 230 and payload 150 by the time the payload 150 contacts the delivery surface 230. To that end, control commands may be generated to maneuver the UAV 100 so as to keep the payload 150 within a particular descent envelope relative to the delivery surface 230 while lowering the payload 150. The descent envelope may define a three-dimensional space through which the payload 150 is to be lowered from the UAV 100 to the delivery surface 230, and may define tolerances for the position of the payload 150 relative to the position of the delivery surface 230. In some embodiments, the descent envelope includes a tolerance profile which defines an allowable range of a predetermined characteristic of the payload 150 for at least one position relative to the delivery surface. According to some examples, the tolerance profile may define a maximum lateral (i.e., horizontal) displacement of the payload 150 with respect to the delivery surface 230 for at least one vertical position above the delivery surface 230. According to other examples, the tolerance profile may define a maximum change in orientation or relative orientation of the payload 150 with respect to the delivery surface.

Figure 7D:
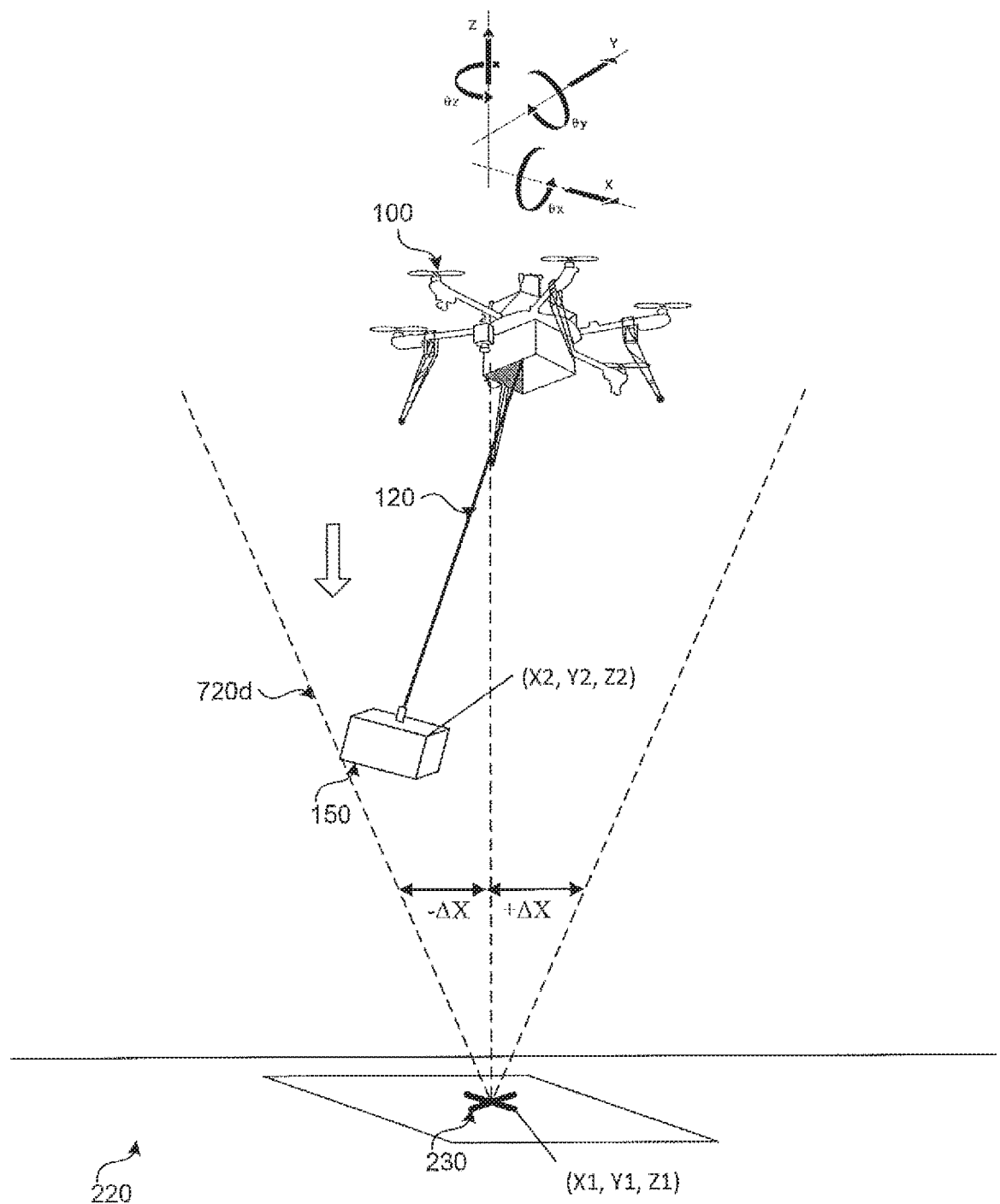
FIG. 7D is a schematic diagram showing an example descent envelope of a payload during delivery according to an embodiment.
Figure 8C:
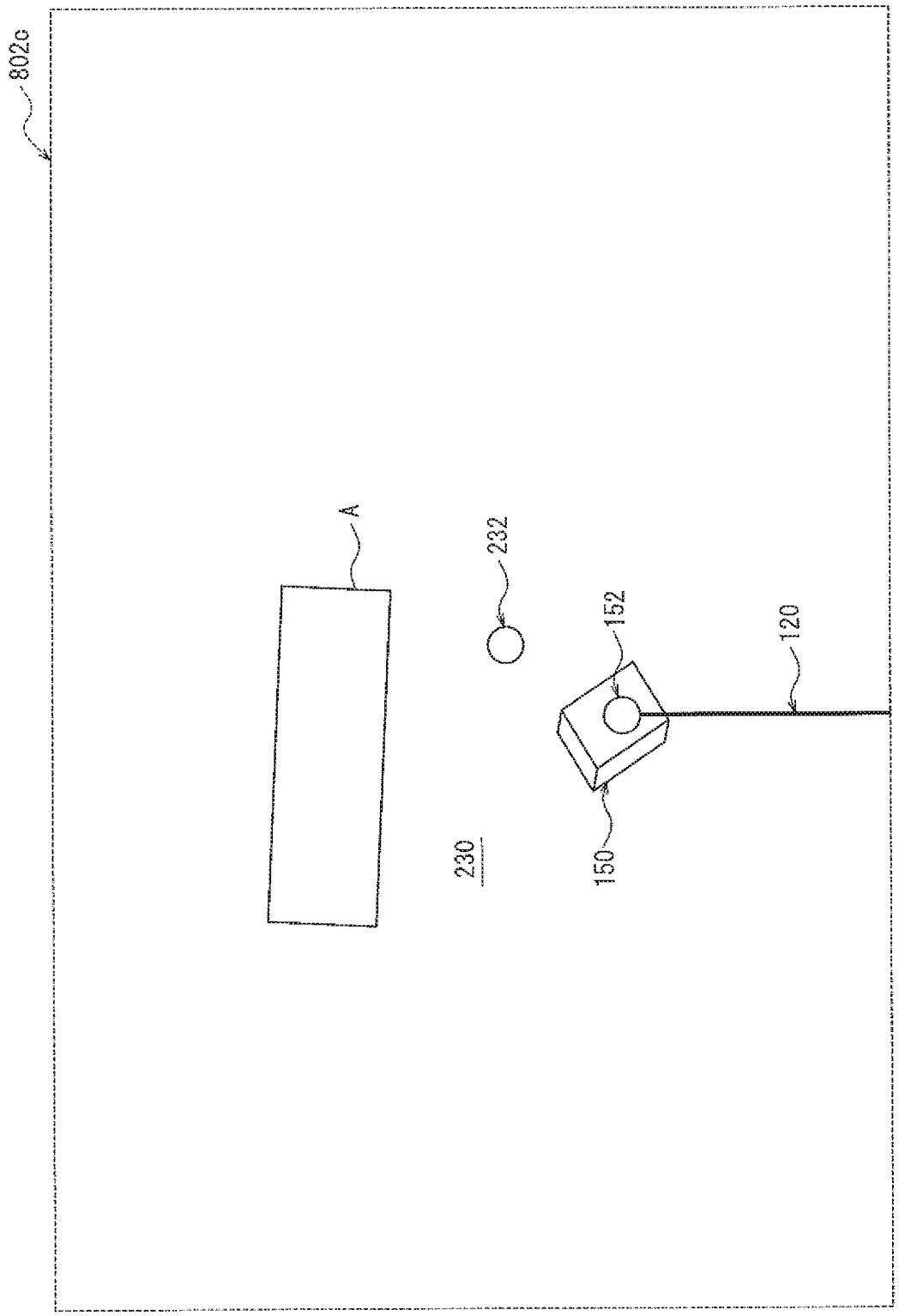

FIG. 7D shows an illustration of an example descent envelope 720*d* of a payload 150 during automated delivery. The example scenario depicted in FIG. 7D is similar to the example scenarios depicted in FIGS. 7A-7C. In the example depicted in FIG. 7D, the example decent envelope 720*d* defines a maximum separation distance (i.e., horizontal displacement) in the X direction a positive and negative ΔX centered on the X1 coordinate of the delivery surface.

As shown in FIG. 7D, the maximum separation distance ±ΔX in the X direction gradually reduces as the Z2 coordinate of the payload 150 approaches the Z1 coordinate of the delivery surface 230 so as to avoid drastic positional adjustments when the payload is near the ground. For clarity, the maximum separation distance along in the Y direction is omitted from FIG. 7D, but in an embodiment would mirror the maximum separation distance along in the X direction resulting in a conical descent envelope. As shown in FIG. 7D, the UAV 100 may autonomously maneuver (i.e. adjust its position) to align the (X2, Y2) coordinate of the payload 150 with the (X1, Y1) coordinate of the delivery surface 230 while remaining within a certain tolerance (±ΔX, ±ΔY) from the (X1, Y1) coordinate of the delivery surface 230 as the Z2 coordinate of the payload 150 approaches the Z1 coordinate of the delivery surface 230.

Note that the descent envelope depicted in FIG. 7D is an example provided for illustrative purposes. Depending on the implementation, a different tolerance profile may be utilized. In some embodiments, the descent envelope 720*d* may be the same for all automated deliveries. In other embodiments, the descent envelope 720*d* may be configured (e.g., by a user or automatically by a computer) at the initiation of the delivery sequence based on characteristics of the delivery sequence (e.g., payload type, payload weight, delivery surface type, environmental conditions, atmospheric conditions, obstacles in the vicinity of the delivery surface, delivery location, etc.). In some embodiments, the descent envelope 720*d* may dynamically adjust during the delivery sequence in response to detected events. For example, detected gusts of wind or moving objects (e.g., people, vehicles, animals, etc.) in the vicinity, may cause the system to tighten the descent envelope 720*d* (i.e., reduce the ±ΔX, ±ΔY) tolerances) as the payload 150 is lowered to err on the side of caution. Similarly, the descent envelope may be updated in response to determining that the delivery surface has moved while the payload 150 is being lowered. In such examples, the UAV 100 may track the position of the delivery surface 230 as the payload 150 is lowered towards the ground.

Although not shown in FIG. 7D, the principles described with respect to positional tolerance may similarly be applied to other estimated characteristics of the payload 150 such as relative orientation, relative velocity (linear and/or angular), and relative acceleration (linear and/or angular). For example, consider again the example scenario depicted in FIG. 7C in which an orientation of both the payload 150 and delivery surface 230 can be tracked by tracking multiple positions at each object. In such a scenario, a successful delivery may require that the payload 150 be aligned in a certain way relative to the delivery surface 230 by the time the payload 150 contacts the delivery surface. Similar to the positional tolerances described above, the descent envelope 720*d* may also define relative orientation tolerance that gradually reduces as the Z2 positional coordinate of the payload 150 approaches the Z1 positional coordinate of the delivery surface 230.

If during the delivery sequence, the UAV 100 determines that the position of the payload 150 is outside the descent envelope (i.e., falls outside of the tolerances defined by the descent envelope 720*d*), one or more of several actions may be taken. In an example embodiment, the UAV 100 may automatically maneuver to abort the delivery sequence in response to detecting conditions that fall outside acceptable tolerances. For example, an abort decision may trigger a predetermined set of control commands configured, for example, to retract the payload 150 while increasing the altitude of the UAV 100. In an embodiment, an abort sequence may also be triggered manually in response to an input from a remote human operator. In any case an abort decision may involve a full abort or a partial abort. A full abort may involve, for example, completely retracting the payload 150 and securing to the UAV 100 before either retrying the delivery sequence at the current selected delivery surface 230, attempting to identify an alternative delivery surface at the delivery location, flying to an alternative location, or reverting to manual control (e.g., by a remote human operator). In contrast, a partial abort may involve less drastic actions to stabilize the situation in an attempt to salvage the delivery sequence. For example, in response to a triggered partial abort, the UAV 100 may pause the lowering (or at least reduce the rate of lowering) of the payload 150 while making positional adjustments to try to get back to within acceptable tolerances. For example, consider the scenarios depicted in FIGS. 7B and 7D in which the payload 150 is offset from the UAV 100, for example, due to a gust of wind. In this situation, the payload 150 may fall into a pendulum-like motion causing the relative positions of the payload 150 and delivery surface 230 to fall in and out of tolerances. Provided that the payload 150 is not low enough to present a collision danger, the UAV 100 may respond with a partial abort that includes pausing the lowering of the payload 150 and positional adjustments to null the pendulum motion of the payload 150. Once within acceptable tolerances, the delivery sequence may continue.

A decision to initiate a full or partial abort may be based on a number of factors, such as how far out of tolerance the relative positions of the payload 150 and delivery surface 230 are, how long the relative positions of the payload 150 and delivery surface 230 have remained outside of tolerance, how close the payload 150 is to the delivery surface 230, type of payload 150, environmental conditions, detected moving objects in the vicinity (e.g., people, vehicles, animals), availability of alternative delivery surfaces/locations, remaining power at the UAV 100, etc.

FIGS. 8A-8D show a sequence of illustrative views 802*a-d* that are captured, for example, from an image capture device on the main body of a UAV as a payload 150 is lowered towards a delivery surface 230 (in this case a portion of an open field). As shown in FIGS. 8A-8D, by the time the payload 150 reaches the delivery surface 230 (in this case the ground) point 152 is aligned with point 232. Recall that during this sequence, the UAV 100 is maintaining a constant or substantially constant altitude (e.g., 20 meters) above the delivery surface 230. Accordingly, changes in the position of point 152 (representing payload 150) relative to point 232 (representing the delivery surface 230) can be accomplished by controlling the lateral (i.e. horizontal) position of the UAV 100 while lowering the payload 150 using the delivery mechanism cable 120.

Figure 9:
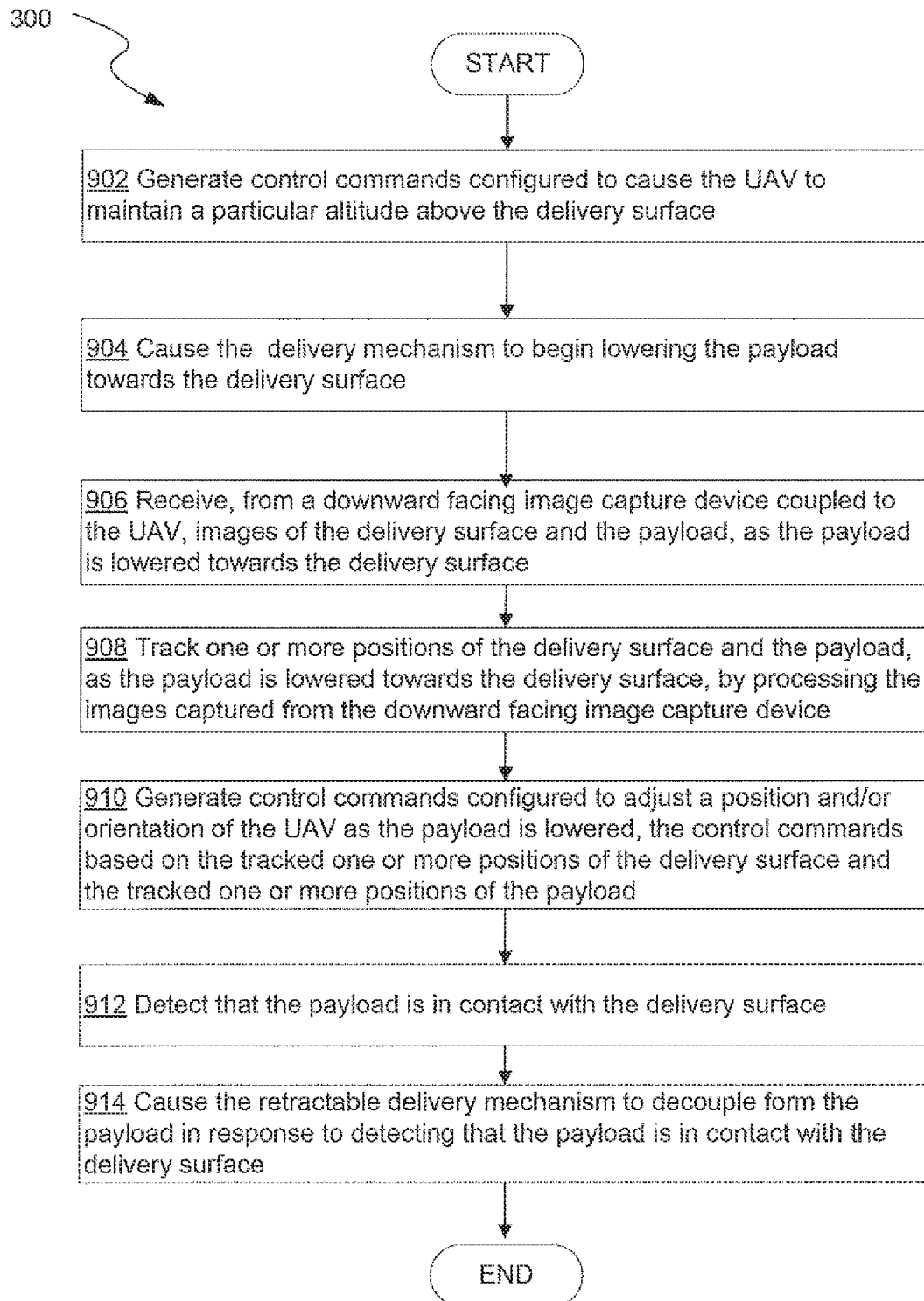
FIG. 9 is a flow diagram showing an example process for payload-based control of a UAV during a delivery sequence according to an embodiment.

FIG. 9 is a flow chart describing an example process 900 for payload-based control of a UAV during a delivery sequence, similar to as described above.

Example process 900 begins at step 902 with generation of data specifying one or more control commands configured to cause the UAV 100 to maintain or at least substantially maintain a particular altitude (i.e., hover) above a delivery surface 230 (e.g., the delivery surface selected according to processes 500 or 600). For example, the control commands may comprise one or more propulsion commands which are configured to control a propulsion system of the UAV to maintain the particular altitude.

At step 904, one or more control commands are generated that are configured to cause a retractable delivery mechanism (e.g., the aforementioned mechanical cable spool) to begin lowering the payload 150 towards the delivery surface 230. In some embodiments, the payload 150 is lowered at a constant and/or predetermined rate. Such a rate may be predetermined based on a number of factors such as content of the payload, weight of the payload, atmospheric conditions (e.g., wind), altitude above the delivery surface, etc. Alternatively, in some embodiments, the rate of lowering the payload 150 can vary during the decent based on certain factors. For example, in some embodiments the mechanical cable spool may begin at a higher initial rate and reduce as the payload 150 gets closer to the ground to allow for positional corrections before touchdown and a softer landing. In some embodiments, the mechanical cable spool may adjust the rate of lowering the payload in response to certain factors such as gusts of wind, changed conditions at the delivery surface, airborne collision risks, etc.

The delivery mechanism of UAV 100 may include certain automated safety features to reduce any risks associated with obstacles in the physical environment. For example, the retractable delivery mechanism may be configured to automatically retract the cable in response to detecting a collision between the payload 150 and another physical object before the payload 150 is delivered to the delivery surface 230. This detection may be based on images of the payload 150 which are captured as it is being lowered, unexpected changes in the load on the cable spool, or detect changes in acceleration at the UAV 100 and/or the payload 150. In some embodiments, a cable spool may be configured to automatically detach from the payload 150 and/or the UAV 100 in response to detecting a collision. For example, based on the situation, it may be favorable to detach the delivery mechanism from the UAV 100 and lose the payload if the UAV 100 is at risk.

At step 906, images of the physical environment at a designated delivery location 220 (including the delivery surface 230 and the payload 150) are received from an image capture device 112 coupled to a UAV 100 as the payload 150 is lowered towards the delivery surface 230.

At step 908, the received images are processed to estimate and track positions and/or orientations of the delivery surface 230 and the payload 150 relative to the UAV 100 for example using any of the techniques described above with respect to FIG. 7A-7C.

At step 910, control commands are generated that are configured to adjust the position and/or orientation of the UAV 100 based on the tracked positions and/or orientations of the delivery surface 230 and the payload 150. Specifically, as described above, in some embodiments, the control commands may comprise propulsion commands which are configured to control the propulsion system to adjust the lateral (i.e., horizontal) position of the UAV 100 while substantially maintaining a vertical position (altitude), so as to align the tracked lateral positions of the delivery surface 230 and payload 150 by the time the payload contacts the delivery surface 230. In some embodiments, control commands generated during the delivery sequence may be calibrated for more precise positional adjustments, for example by adjusting gain settings in a flight controller.

Note that depending on the situation, control commands may also comprise propulsion commands configured to adjust a vertical position of the UAV 100 in addition to, or alternatively to, adjusting the lateral (i.e., horizontal) position. For example, consider a situation in which a UAV 100 is overhead a delivery surface 230, but detects that an obstacle such as a tree canopy is between the UAV 100 and the delivery surface 230. The obstacle may be detected using similar computer vision techniques described above. Depending on the obstacle type, a flight controller may generate one or more control commands to reposition the UAV 100 so as to avoid the obstacle before lowering the payload. For example, the flight controller might generate control commands configured to cause the UAV 100 to descend below the tree canopy (while avoiding the obstacle along the way) so as to provide an unobstructed path down which to lower the payload 150.

In some embodiments, the control commands may be generated to maintain the UAV 100 within a holding envelope rather than at a predetermined altitude. In such embodiments, the holding envelope may define a three-dimensional space within which the UAV 100 is to be maintained while the payload 150 is being lowered towards the delivery surface 230. For example, the holding envelope may define a three dimensional space with respect to a predetermined altitude above the delivery surface. Moreover, in some examples the holding envelope may be determined on the basis of one or more obstacles in the vicinity of the delivery surface. In such examples, the holding envelope may be determined by the UAV 100 based on its proximity to the one or more obstacles. According to some embodiments, the UAV 100 may perform one or more maneuvers to abort the delivery process in response to determining that the aerial vehicle is outside the holding envelope while the payload is being lowered by the delivery system towards the delivery surface.

In some embodiments, example process 900 continues at step 912 with detecting that the payload 150 is in contact with the delivery surface 230. This can be accomplished several ways. For example, the delivery mechanism may sense a decrease in the load caused by the suspended payload 150 indicating that the payload 150 has contacted the delivery surface 230. In some embodiments computer vision may be used to detect when the payload 150 is in contact with the delivery surface 230. In some embodiments a remote human user monitoring a video feed from the image capture device 112, may determine that payload 150 is contact with the delivery surface 203, and may provide an input via an input device indicating as such. One or more of the aforementioned techniques as well as other techniques not mentioned (e.g., electromechanical impulse received through the tether) may be applied in combination to verify that the payload 150 is in contact with the delivery surface 230.

In response to detecting that the payload 150 is in stable contact with the delivery surface 230, at step 914 the delivery mechanism may automatically detach from the payload 150 and retract back into the UAV 100.

Balcony Delivery System

In some environments, an acceptable delivery surface may be difficult to find. Consider, for example, a dense urban environment including multi-story apartment buildings. In such an environment, available surfaces such as the sidewalk outside of a building or the roof of the building may not be practical or possible for use as a delivery surface for a number of reasons. For example, lowering a payload onto a busy city sidewalk could pose a risk to pedestrians occupying the sidewalk. Also, an apartment tenant receiving a delivery may not want that delivery lowered into an unsecured area such as the street outside the building. The roof of the building, although slightly more secure may also be undesirable in certain situations, for example, where a receiving tenant does not have access to the roof To address the problem of a suitable delivery surface, a balcony delivery system can be utilized. In one embodiment, the balcony delivery system may include a temporary (i.e., removable) or permanent delivery structure that can serve as a delivery surface for receiving deliveries in challenging environments such as a dense city.

Figure 10A:
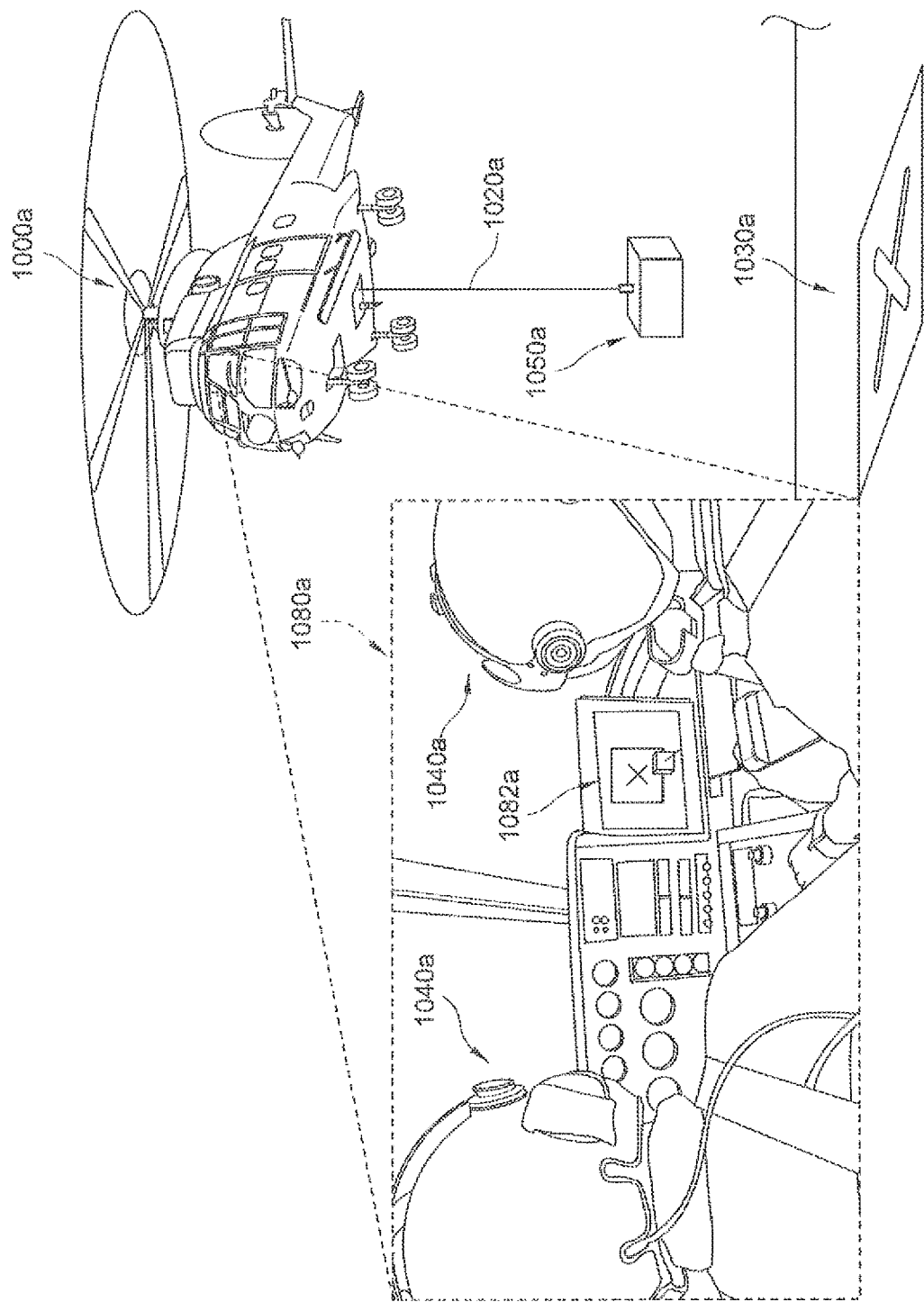
FIG. 10A is a schematic diagram showing payload-based control of a UAV in the context of manned aircraft according to an embodiment.
Figure 10B:
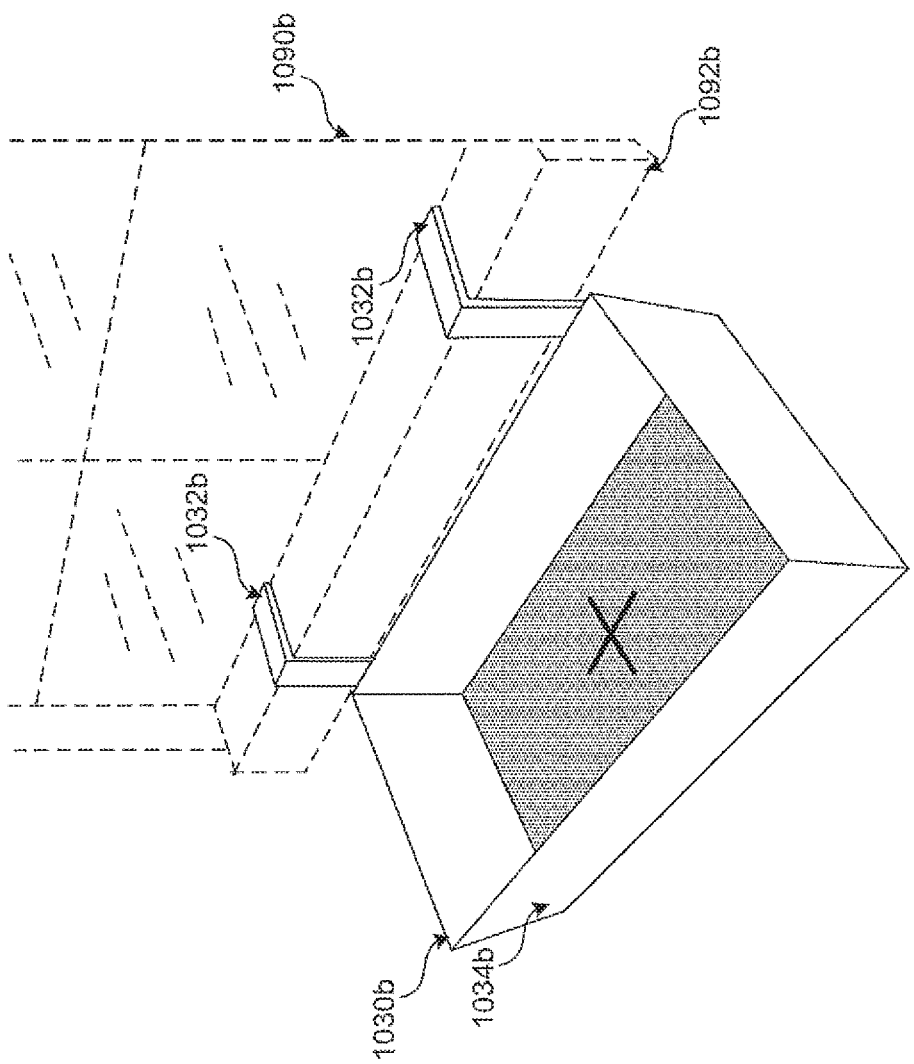
FIG. 10B is a schematic diagram showing an example delivery structure in the form of a temporary balcony structure that can serve as a delivery surface for receiving payloads according to an embodiment.

FIG. 10B shows an example delivery structure 1030b in the form of a temporary balcony structure that can be affixed to the side of a building 1090b and serve as a delivery surface for receiving payloads. As shown in FIG. 10B, the example, delivery structure 1030b may include a box, bucket, basket, net, or any other type of structure affixed to the side of a building 1090b. In the example embodiment depicted in FIG. 10B, the delivery structure 1030b is attached to the sill 1092b of a window, for example, using brackets 1032b.

The example embodiment depicted in FIG. 10B is provided for illustrative purposes and is not to be construed as limiting. For example, the delivery structure 1030b may be more permanently affixed to the building 1090b using bolted on brackets. In other embodiments, the delivery structure 1030b may be configured to be detachably or permanently affixed to a different part of a building such as a column, pole, trim, fence, etc. In some embodiments, the delivery structure 1030b may include a universal mounting bracket that can be reconfigured to attach to different objects.

As shown in FIG. 10B, the example delivery structure 1030b can include sidewalls 1034b configured to secure a payload once delivered by an aerial vehicle using any of the techniques described in this disclosure. The sidewalls 1034b may be made of any material or structure appropriate to secure a given payload type. For example, the sidewalls may have a solid rigid construction (e.g., solid walls made of plastic, metal, wood, etc.), a perforated rigid construction (e.g., a metal basket, etc.), a flexible construction (e.g., netting), or any combination thereof. In an embodiment, the sidewalls 1034b may be mechanically actuated to open and close in during the delivery sequence. For example, the sidewalls 1034b may be opened to create a flat platform with greater surface area to facilitate delivery of the payload 150 by the UAV 100. In response to detecting that the payload 150 is in contact with the delivery structure 1030b, the adjustable sidewalls 1034b may automatically close to secure the payload 150.

The delivery structure 1030b may include other mechanisms (not shown) for securing a payload once delivered. For example, the payload may be secured using any one or more of mechanical clamps or clips (including hook-loop mechanisms such as Velcro™), magnets, adhesives, or any other means for temporarily securing the payload to the delivery structure 1030b upon delivery. In an example embodiment, a payload box includes a Velcro™ "rug" portion including multiple micro loop structures and a delivery surface portion of the delivery structure 1030b includes a Velcro™ hook portion including multiple micro hook structures. When the payload contacts the delivery structure, Velcro™ portions cause the payload to adhere to the structure. Further, as previously discussed, in response to detecting contact, a delivery mechanism (e.g., a retractable cable) associated with the UAV 100 may automatically de-couple from the payload.

Although not necessary, in some embodiments, a delivery structure 1030b may include features to assist the automated delivery sequence. For example, the delivery structure may include specific markings configured to be recognizable and trackable by a computer-vision based automated delivery system. In some embodiments, the specific markings may take the form of an optical machine-readable code, such as a barcode (e.g., a linear barcode or a matrix barcode), which encodes an identifier associated with the delivery structure and/or a user of the delivery structure. In such embodiments, the UAV may be equipped with a computer-vision system which is configured to identify the delivery structure as the delivery surface by imaging the optical machine-readable code and confirming that the encoded identifier corresponds to the particular payload to be delivered. In some embodiments, the computer vision system may be configured to recognize a region or pattern of Velcro™ associated with the delivery structure 1030b. For example, the delivery structure 1030b may be white or some other light color while the Velcro™ region is black or some other dark color. A computer vision system associated with a UAV may track the Velcro™ portion of the delivery structure 1030b based in part on the contrast between the Velcro™ portion on the rest of the structure. In some embodiments, the delivery structure 1030b may include sensing, processing, and/or communications capabilities (e.g., a beacon) to assist in the automated delivery sequence. For example, the delivery structure 1030b may include a GPS receiver (not shown) to estimate a global position and a wireless communications transmitter (e.g., cellular) to communicate the estimated position to a remote computing device and/or directly to the delivering UAV.

In some embodiments, the delivery structure 1030b may adjust its position relative to a building or structure to which the delivery structure 1030b is attached. For example, to assist delivery of the payload 150, the delivery structure 1030b (or at least a portion of the delivery structure 1030b) may automatically adjust its position and/or orientation (e.g., using a mechanical arm) to track a position and/or orientation of the payload 150.

In some cases, the example delivery mechanism 1030b can be offered to customers or users as a means for receiving their deliveries. Consider, for example, a grocery delivery service operating in an urban environment. Subscribing customers may be provided with a delivery structure, for example, similar to the structure depicted in FIG. 10B. In an example scenario, a customer located in an apartment is cooking and notices that they need a gallon of milk. The customer can order a gallon of milk from the delivery service, for example, via an application instantiated at a computing device such as a personal computer or a mobile device. In response to receiving the order, the delivery service dispatches a UAV with a payload containing the milk towards the location of the customer's apartment building. The delivery service may also transmit a notification to the customer (e.g., via the customer's computing device) informing the customer that the delivery is on the way and requesting that the customer place their delivery structure 1030b in an appropriate location (e.g., an exterior window sill 1092b). In some embodiments, after receiving the order form the customer, the delivery service may wait for confirmation that the delivery structure 1030b has been placed correctly before dispatching the UAV with the payload. For example, as previously mentioned, the delivery structure may include sensors and communication devices or systems (e.g., cellular transceivers). After the customer places the order, the customer places the delivery structure 1030b in place on the window sill 1092b. Sensors within the delivery structure 1030b detect that the delivery structure is in place and transmit a confirmation (e.g., via cellular) to a remote computing device associated with the delivery service. In response to receiving this confirmation, the delivery service dispatches a UAV with a payload containing the requested product.

Figure 10C:
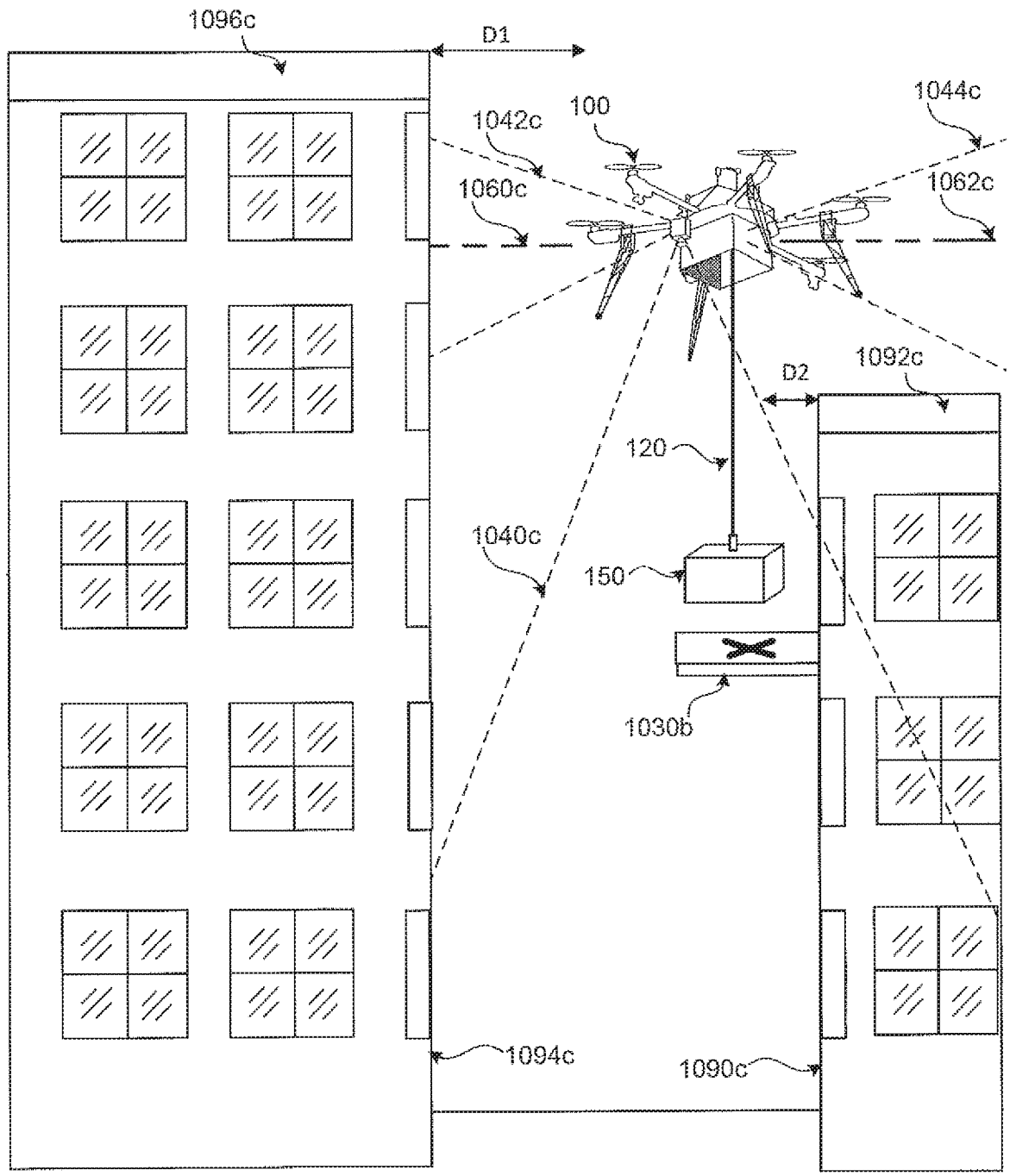
FIG. 10C is a schematic diagram showing an example delivery of a payload by a UAV onto a balcony delivery system according to an embodiment.

FIG. 10C shows an example delivery of a payload 150 by a UAV 100 onto a balcony delivery system, for example, similar to the delivery structure 1030b depicted in FIG. 10B. As shown in FIG. 10C, during a delivery sequence, the UAV 100 may need to navigate a complex environment including multiple obstacles such as buildings 1090c and 1094c and various other obstacles of varying heights and dimensions. To deal with such obstacles, the UAV 100 may be fitted with additional sensing capabilities. For example, as shown in FIG. 10C, in addition to a downward facing image capture device capturing the FOV 1040c, the UAV 100 may include additional image capture devices to capture lateral FOVs 1042c and 1044c. Using computer vision, images captured in FOVs 1042c and 1044c may be used to estimated separation distance to obstacles such as building 1094c. Alternatively, or in addition, the UAV 100 may include lateral proximity detection sensor devices such as LIDAR emitting beams represented by dotted lines 1060c and 1062c.

Using the autonomous navigation technique described in this disclosure, the UAV 100 will lower payload 150 towards the delivery structure 1030b which includes a delivery surface. During operations close to obstacles such as buildings 1090c and 1094c, the motion of the UAV 100 may be constrained according to certain flight rules. For example, control commands generated to maneuver the UAV 100 may be constrained so as to maintain a minimum lateral (i.e., horizontal) separation D1 between the UAV 100 and a fixed obstacle such as building 1094c. Similarly, control commands may be constrained so as to maintain a minimum lateral (i.e., horizontal) separation D2 between the payload 150 and a fixed structure such as building 1090c. Similarly, a descent window (see e.g., FIG. 7D) including an allowable range of positioning of the payload 150 relative to a position above the delivery structure 1030b may be narrowed when operating around tall building or other high risk obstacles. In an embodiment automated deliveries to multi-story buildings, for example as shown in FIG. 10C, may be scheduled according to certain rules to reduce the risk of collisions with obstacles. For example, if multiple deliveries are scheduled at a same building, deliveries at lower floors may be scheduled before deliveries at upper floors.

According to some embodiments, the UAV 100 may receive information for identifying a delivery structure to which a given payload is to be delivered. In some examples, the information may specify an identifier encoded in an optical machine-readable code disposed on the delivery structure. In such embodiments, the UAV 100 may be equipped with a computer-vision system which is configured to identify the delivery structure at the delivery structure by imaging the optical machine-readable code and confirming that the identifier encoded therein matches that received by the UAV 100. In some embodiments, the information received by the UAV 100 may include positional information that specifies a vertical position or a vertical height of the UAV 100, thereby enabling the UAV 100 to discriminate between different delivery structures located in respect of the same building, and thus sharing the same geographical location. In some embodiments, the UAV 100 may receive the information directly from the delivery structure 1030b upon arrival at the delivery location.

As a further alternative, the database to which the UAV has access in order to recognize objects that are captured by the computer-vision system may include three dimensional plans of buildings, together with the geographical coordinates of one or more recognizable features, such as corners, of the building. In addition to detailing height, width and depth, these plans may include floor plans that indicate the locations of individual balconies for each floor of the building. A combination of the geographic location of at least one recognizable feature of the building and the floor plans enables the UAV to identify exactly where any given balcony is located. As will be appreciated, this technique is particularly appropriate in the absence of any bespoke balcony delivery structure and/or a beacon or machine-readable code that enables the computer-vision system to identify a particular balcony.

Independent Positioning of Payload

According to some embodiments, the propulsion system of the UAV 100 may include a propulsion system (i.e., a first propulsion system) provided to the main body of the UAV, and a propulsion sub-system (i.e., a second propulsion system) for maneuvering the payload 150 independently of the main body of the UAV 100. In some embodiments, the propulsion sub-system may be provided to a payload holder which includes the coupling mechanism for coupling the payload holder to the payload 150. The payload holder may be connected to the end of the extendable tether such that payload holder can be lowered from the main body of the UAV 150 towards a delivery surface 230. Thus, by controlling the propulsion sub-system provided to the payload holder, the UAV 100 may control at least the lateral (i.e., horizontal) position of the payload 150 independently of the position of the main body of the UAV 100. This independent maneuvering of the payload holder enables precise positioning of the payload 150 with respect to, for example, a delivery surface 230 or a descent envelope, and/or delivery of the payload 150 to a delivery surface 230 which would not otherwise be accessible from the UAV 100. The payload sub-system provided to the payload holder may receive power from a battery housed in the payload holder or via a powerline from the main body of the UAV 150 (e.g., a powerline integral to the extendable tether).

The UAV 100 may further be provided with a payload holder monitor for obtaining data indicating the current status of the payload during payload delivery. The current status may include the current lateral (i.e., horizontal) position of the payload holder in terms of its geographic coordinates, its position relative to the main body of the UAV, or its position relative to the delivery surface. In other examples, the current status may include the vertical position and/or orientation of the payload holder with respect to the delivery surface. Further, the current status may include an indication of the direction and/or distance to the delivery surface relative to the payload holder.

According to some embodiments, the payload holder monitor may determine the current status of the payload holder on the basis of one or more images of the payload holder captured during the delivery process. For example, the payload holder monitor may determine the current status on the basis of one or more images captured by a downward facing image capture device provided to the main body of the UAV 100 (e.g., the downward facing image capture device 112 of FIG. 1). In such examples, the payload holder monitor may employ computer vision techniques to determine, for example, the current lateral (i.e. horizontal) position of the payload holder with respect to the main body of the UAV 100 and/or the delivery surface 230.

In some embodiments, the payload holder may include a receiver for acquiring the position of the payload holder from a geo-spatial positioning system (e.g., a GPS system) during package delivery. In such examples, the payload holder monitor may obtain the current status of the package holder on the basis of positioning data received from the receiver.

In some embodiments, the payload holder may include a downward-facing image capture device similar to a device provided to the main body of the UAV 100 (similar to e.g., the downward facing image capture device 112 of FIG. 1). In such examples, the payload holder may employ computer vision techniques to determine, for example, the current location of the payload holder relative to delivery surface 230.

The payload holder may include one or more sensors to be used in object recognition and physical sensors to provide inputs to rules for detecting a candidate delivery surface. Such sensors, mounted on the payload holder may for example include a depth scanning or three dimensional surface sensor, for example a LIDAR camera, to survey and determine one or more characteristics of a candidate delivery surface, and/or objects in the proximity of the candidate delivery surface, in order to assist in the selection of an appropriate delivery surface. These sensors may be used after the payload has been at least partly lowered. In this way such that the payload holder is able to obtain higher quality images, three dimensional data and/or other sensor data than any sensor devices on the main body of the UAV 100. In addition, the payload holder image and depth scanning or three dimensional surface sensor(s) may have a different field of view than the field of view of any sensors on the main body of the UAV 100 and therefore may be used to provide more sensor data, relating to the delivery surface and its surroundings, to be used instead of, or in addition to, similar data types sensed by sensor(s) on the main body of the UAV.

In other embodiments, the payload holder may include a delivery surface monitor configured obtain the direction and/or distance to the delivery surface relative to the payload holder. The delivery surface monitor may include a receiver configured to receive a signal from a beacon located at the delivery surface. For example, the receiver may be an infrared receiver configured to determine the direction based on infrared signals received from an infrared beacon, or a radio receiver configured to determine the direction on the basis of radio signals received from a radio beacon. Similarly, the receiver may determine the direction to the delivery surface based on signals received from a wireless access point (e.g. a Wi-Fi™ router), a Bluetooth™ beacon, or the like. The direction acquired by the delivery surface monitor may be used to provide precise positioning of the payload holder with respect to the delivery surface, and thus facilitate accurate delivery of the payload. This precise positioning of the payload during payload delivery may be achieved by control of the propulsion system provided to the main body of the UAV 100 (i.e., the first propulsion system) and/or the propulsion subsystem provided to the payload holder (i.e. the second propulsion system). These propulsion systems may be controlled by one or more respective propulsion controllers, which in turn may be operated based on propulsion control data specifying one or more propulsion commands generated or received by the UAV 100. In some embodiments, the propulsion controller for controlling the propulsion sub-system may be housed in the payload holder and receive propulsion control data from the main body of the UAV 100. In such embodiments, the propulsion controller for controlling the propulsion sub-system may communicate with the main body of the UAV 100 using a wireless communication link or a wired communications link (e.g., a wired communication link integral to the extendable tether).

Figure 10D:
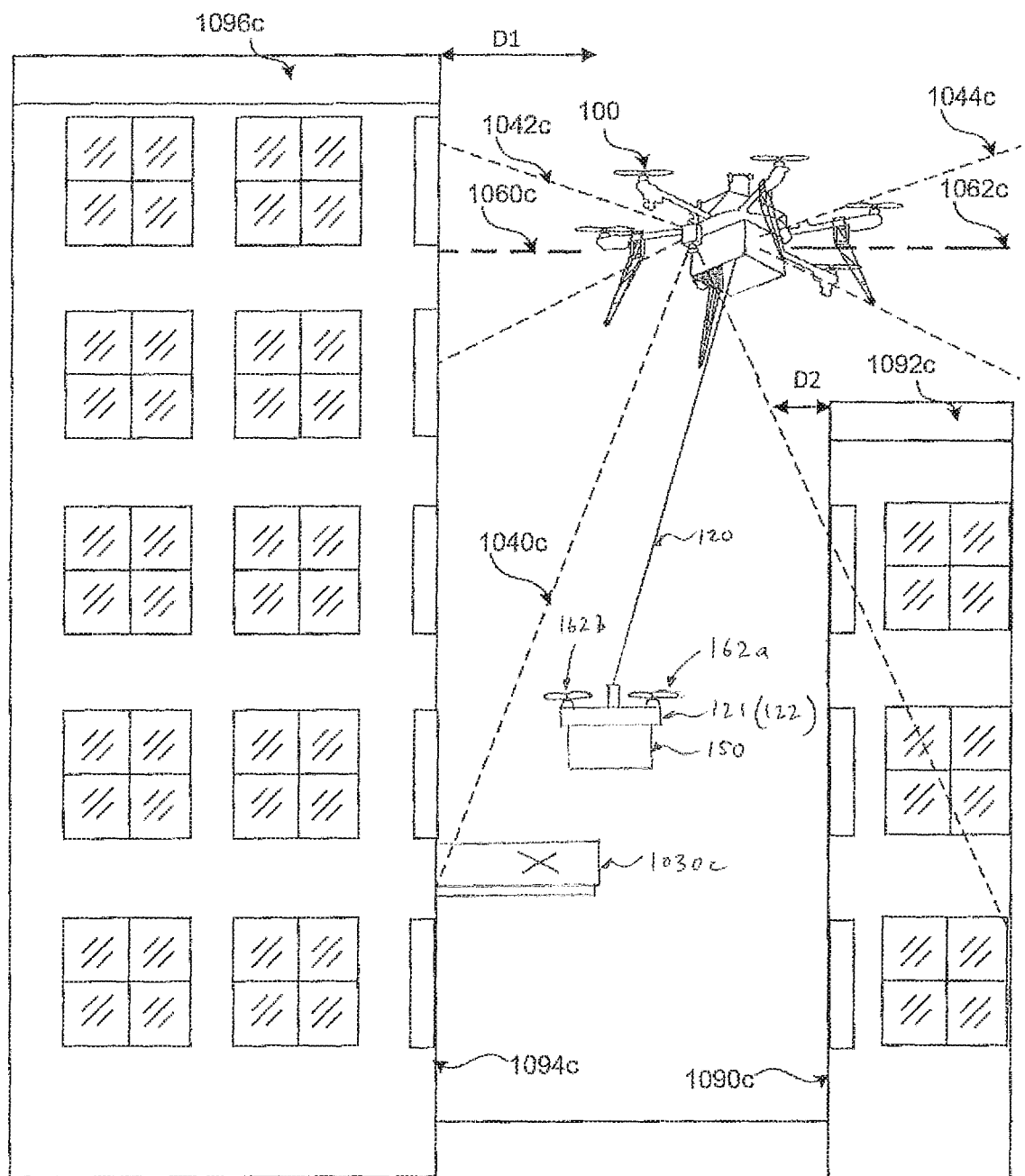
FIG. 10D is a schematic diagram showing an example delivery of a payload by a UAV onto a balcony delivery system according to another embodiment.

FIG. 10D illustrates an embodiment according to which the UAV 100 is provided with a propulsion sub-system for positional control of a payload holder as described above. In particular, FIG. 10D illustrates an embodiment in which the UAV 100 includes a payload holder 121 and a propulsion sub-system 162. In this embodiment, the propulsion sub-system 162 includes a plurality of rotors 162*a*, 162*b* which enable precise lateral (i.e., horizontal) positioning of the payload holder 121 independent of the main body of the UAV 100 as discussed above. In this respect, it will be understood that any type of propulsion system capable of generating a thrust force in a substantially lateral (i.e., horizontal) direction may be employed as the propulsion sub-system 162. Further, because the propulsion system provided to the main body typically provides a force sufficient to maintain the payload holder 121 and payload 150 in flight, it will be understood that propulsion sub-system 121 may not be required to generate a lifting thrust force (i.e., a thrust force in the vertical direction). Thus, the propulsion sub-system 121 may implemented as a relatively low power (i.e., lightweight) propulsion system relative to the propulsion system provided to the main body, whilst still providing precise lateral (i.e., horizontal) positional control of the payload holder.

In the present embodiment, the delivery surface is provided by a delivery structure 1030*c*, in the form of a balcony or a temporary balcony structure affixed to the side of building 1094*c*, as described above in relation to the delivery structure 1030*b* of FIG. 10C.

As shown in FIG. 10D, during a delivery phase, the UAV 100 may need to navigate a complex environment including multiple obstacles, such as buildings 1090*c* and 1094*c* and various other obstacles of varying heights and dimensions. To deal with such obstacles, the UAV 100 may be fitted with additional sensing capabilities, as described above with reference to FIG. 10C. Further, as described above with reference to FIG. 10C, positioning of the UAV 100 may be constrained by a prescribed minimum lateral (i.e., horizontal) separation D1 between the UAV 100 and the building 1094*c* and a prescribed lateral (i.e., horizontal) separation D2 between the UAV 100 and the building 1090*c*. In some embodiments, the UAV 100 may determine a holding envelope including an allowable range of positioning of the main body of the UAV 100, as described above, based at least in part on the prescribed minimum lateral separations D1 and D2.

FIG. 10D shows an example according to which the constraints imposed by the prescribed minimum lateral separations D1 and D2 prevent the UAV 100 from maneuvering the main body to a position from which the payload 150 can be lowered directly to the delivery surface provided by delivery structure 1030*c* under the influence of gravity alone. In other words, the allowable range of positioning of the main body of the UAV 100 specified by the holding envelope does not include a position from which the payload 150 can be lowered directly to the delivery surface provided by the delivery structure 1030*c* under the influence of gravity alone. Thus, to complete delivery of the payload 150, the UAV 150 uses the propulsion sub-system 162 to maneuver the payload holder 121 in a substantially lateral (i.e., horizontal) direction towards the delivery structure 1030c, independent of positional control of the main body of the UAV 150. That is, the UAV 150 uses the propulsion sub-system 162 to maneuver the payload holder 121 to a position that is laterally (i.e., horizontally) offset with respect to a position of the main body.

As discussed above, the UAV 100 may control the propulsion sub-system 121 on the basis of current status data indicating the position of the payload holder 121 during delivery of the payload. For example, the UAV 100 may control the propulsion sub-system 121 on the basis of propulsion control data which is generated by processing current status data in association with delivery control data for the payload. In this respect, the delivery control data comprises data specifying or enabling determination of the delivery surface and may include data indicating the position (e.g., geo-spatial coordinates) of the delivery surface provided by the delivery structure 1030c. In other examples, the delivery control data may identify the delivery surface provided by the delivery structure 1030c in an image captured by a downward facing image capture device provided to the main body of the UAV 100. Thus, by processing the current status data for the payload holder in association with the delivery control data, the position of the payload holder 121 with respect to the delivery surface provided by the delivery structure 1030c can be determined, and propulsion data for maneuvering the payload holder 121 towards the delivery surface using the propulsion sub-system 162 can be generated. This processing may be performed locally on the UAV 150 or at a system remote from the UAV 150, as required.

As discussed above, the UAV 100 may control the propulsion sub-system 162 on the basis of current status data indicating the direction and/or distance to the delivery surface provided by the delivery structure 1030c. For example, the payload holder 121 may include a delivery surface monitor configured to obtain the direction and/or distance to the delivery surface relative to the payload holder, as described above. In such embodiments, the delivery control data may include data, such as an identifier associated with a beacon, which enables the delivery surface monitor to locate the locate the delivery structure 1030c and/or discriminate between a plurality of delivery structures and the same nominal delivery location. Thus, by processing the current status data for the payload holder 121 in association with the delivery control data, propulsion data for maneuvering the payload holder 121 in a direction towards the delivery surface using the propulsion sub-system 162 can be generated. Again, this processing may be performed locally on the UAV 150 or at a system remote from the UAV 150, as required.

As described above, independent maneuvering of the payload holder 121 also enables precise positioning of the payload with respect to a descent envelope. Such independent maneuvering of the payload holder 121 may reduce or obviate the need to maneuver the main body of the UAV 150 to control the position of the payload with respect to the descent envelope. When such control is achieved by controlling only the position of the main body of the UAV 150, the magnitude of the associated maneuvers (i.e., the magnitude of positional corrections to the main body of the UAV 150) may increase as the payload is lowed towards the delivery surface (i.e., as the length of the extendable tether increases). In contrast, by maneuvering the payload holder 121 independently of the main body using the propulsion sub-system 162, the magnitude of any maneuvers performed by the main body may be reduced. In some circumstances, this may enable the UAV 150 to operate within a relatively restrictive holding envelope (e.g., necessitated by one or more obstacles at the delivery location) and/or may also reduce the overall energy consumed by the UAV 150 during delivery of the payload.

In the above embodiments, it will be understood that the independent positional control of the payload holder 121 by the propulsion sub-system 162 may be restricted by the capabilities of the propulsion sub-system, the total weight of the payload holder 121 and payload, and any force imparted on the payload holder 121 via the extendable tether. In this respect, it will be understood that such independent positional control is intended to encompass any positional control of the payload holder 121 which is subject to such constraints.

Example Systems for Positioning and Autonomous Navigation by a UAV

Figure 11A:
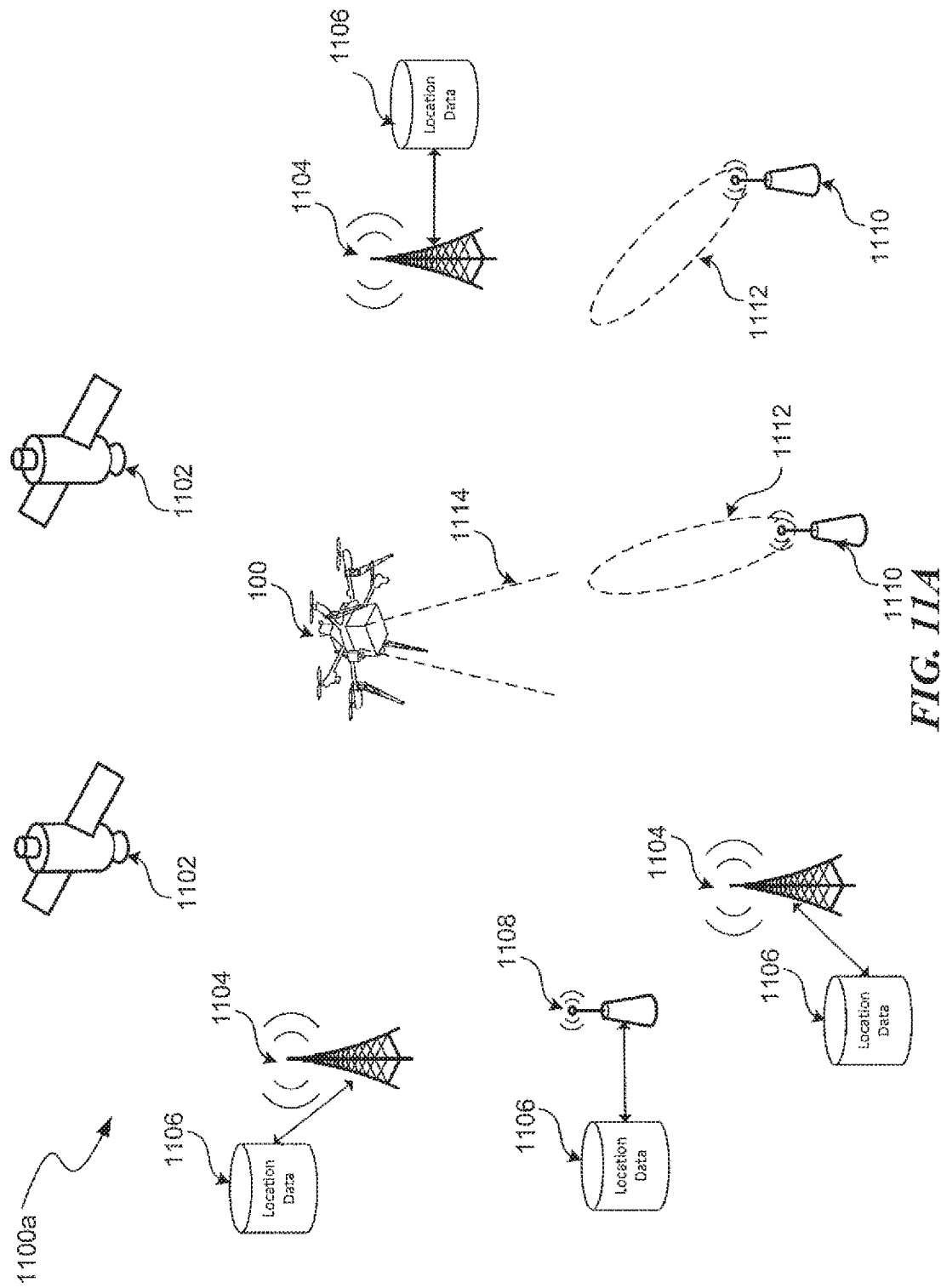
FIG. 11A is a schematic diagram showing an example positioning system, according to an embodiment.

FIG. 11A shows a high-level diagram of an example positioning system 1100a, according to some embodiments, for guiding autonomous navigation by a UAV 100. According to some embodiments, a relative position and/or orientation of the UAV 100, and or a relative position and/or orientation of other objects such as a payload 150 and/or delivery surface 230 may be determined using one or more of the subsystems illustrated in FIG. 11A. It shall be understood that by tracking relative positions and/or orientations over time (continuously or at regular or irregular time intervals (i.e., continually)), the motions (e.g., velocity, acceleration, etc.) of UAV 100 and one or more objects through a physical environment may be estimated. Accordingly, any systems described herein for determining position and/or orientation may similarly be employed for estimating motion. The example system 1100a may include the UAV 100, a global positioning system (GPS) comprising multiple GPS satellites 1102, a cellular system comprising multiple cellular antennae 1104 (with access to sources of localization data 1106), and/or a Wi-Fi™ system comprising multiple Wi-Fi access points 1108 (with access to sources of localization data 1106).

The UAV 100 may comprise components including, but not limited to, an IMU, a GPS receiver, multiple RF receivers and/or transceivers (e.g., cellular LTE, Wi-Fi), and one or more image capture devices. For example, an image capture device may be used to determine position and/or orientation through the use of computer vision techniques and or optics-based collision detection and range finding. This is illustrated conceptually in FIG. 11A by the dotted line 1114. One or more of the above described components of the example UAV 100 are described in more detail with respect to FIG. 13.

As mentioned earlier, a relative position and/or orientation of the UAV 100 and other objects in the physical environment may be determined using one or more of the subsystems illustrated in FIG. 11A. For example, using only the GPS system 1102, a position on the globe may be determined for any device that includes a GPS receiver (e.g., the UAV 100). While GPS by itself in certain implementations may provide highly accurate global positioning it is generally is not capable of providing accurate information regarding orientation. Instead, in some embodiments location measurements based on multiple subsystems shown in FIG. 11A may be used for more precise positioning.

Similarly, using an array of cellular and/or Wi-Fi antennae, a position relative to the known locations of antennae may be determined for the UAV 100 using known positioning techniques. Some known positioning techniques include those based on signal trilateration, for example round trip time of arrival (RTT) in which a signal is sent and received by a signal transceiver and distance is calculated based on the elapsed time; received signal strength (RSS) in which the power levels of the transmitted signal and the received signals are analyzed and a distance determined based on a known propagation loss. Other known positioning techniques include those based on signal triangulation, for example angle of arrival (AoA) in which angles of arriving signals are determined, and through applied geometry, a position is estimated. Current Wi-Fi™ standards, such as 802.11ac, allow for RF signal beamforming (i.e., directional signal transmission using phased-shifted antenna arrays) from transmitting Wi-Fi™ access points. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 11A by dotted lines 1112 emanating from Wi-Fi access points 1110.

Figure 11B:
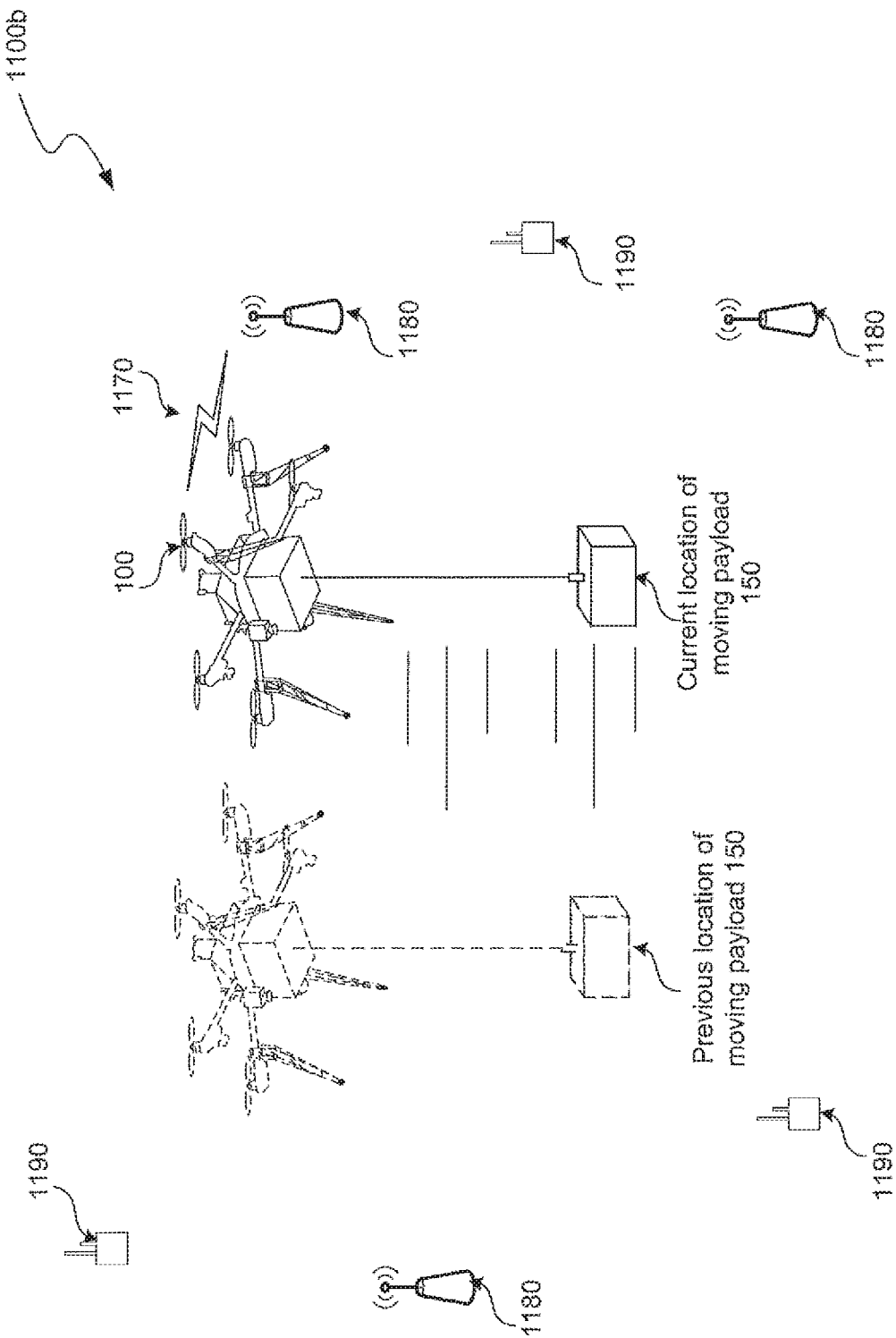
FIG. 11B is a schematic diagram showing an example system for device-free passive localization of an object such as a payload, according to an embodiment.

In some embodiments, an array of Wi-Fi™ transmitters and signal monitors may be utilized for device-free passive localization of objects that are not transmitting signals (e.g., a payload 150). FIG. 11B illustrates an example system 1100b for device-free passive localization of an object (e.g., payload 150). In this example payload 150 passes through a network of Wi-Fi™ transmitters 1180 transmitting RF signals. The signal monitors 1190 (e.g., standard wireless sniffers) may detect changes in the characteristics of the RF signals received from the Wi-Fi™ transmitters 1180 caused by interference as the payload 150 passes through the signal field. Using localization algorithms, such changes in the RF signal field may be correlated to the presence of the payload 150, its type, its orientation and its position. Also according to FIG. 11B., information gathered by device-free passive localization system 1100b may be fed wirelessly (e.g., via Wi-Fi™ connection 1170) to the UAV 100 in order to inform its tracking of the payload 150.

Figure 11C:
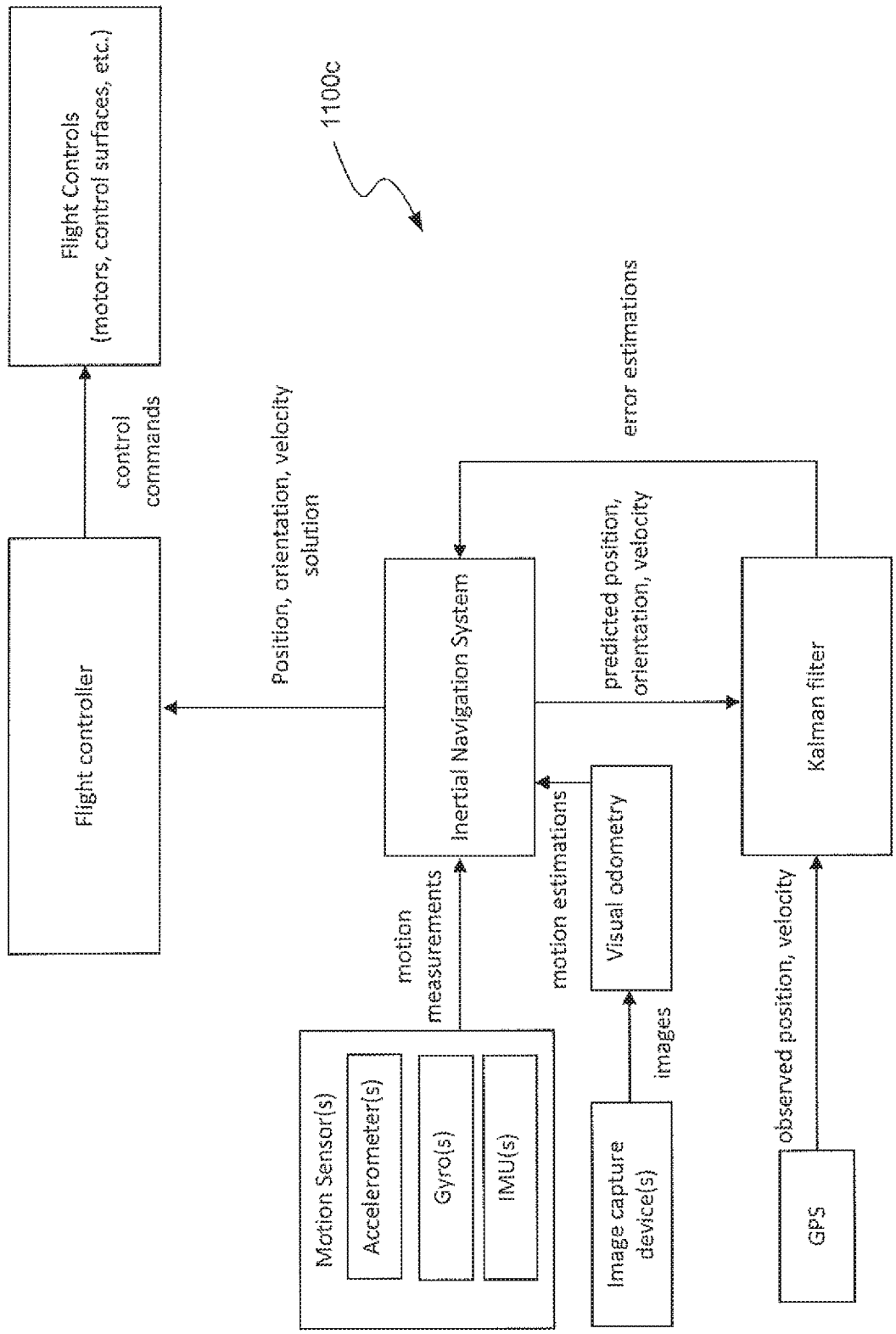
FIG. 11C is a block diagram showing an example system configured to produce optimized position and motion data according to an embodiment.

According to some embodiments an IMU may be used to determine relative position and/or orientation. An IMU is a device that measures a vehicle's angular velocity and linear acceleration. Angular velocity and linear acceleration measurements can be combined with other sources of information (e.g., those discussed above) to accurately infer other information such as position, velocity, orientation, etc. As described herein, a UAV 100 may include one or more IMUs. Using a method commonly referred to as "dead reckoning" an IMU (or associated systems) may calculate and track a predicted current position based on a previously known position(s) using measured accelerations and the time elapsed from the previously known position(s). While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include positioning data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls. A diagram illustrating an example system 1100c that combines measurements from various sensors (e.g., motion sensors, image capture devices, GPS receivers, etc.) to produce optimized (e.g., by applying a Kalman filter) position and motion data is shown at FIG. 11C. As shown in FIG. 11C, this position and motion data can be fed by the navigation system to a flight controller to generate control commands configured to adjust various flight controls (e.g., propulsion system, control surfaces, etc.) so as to maneuver the UAV 100. As the UAV 100 maneuvers, position/motion calculations are updated, thereby creating a feedback loop for achieving autonomous navigation between locations.

Visual Odometry—Estimating Position and Orientation Using Computer Vision

Figure 12:
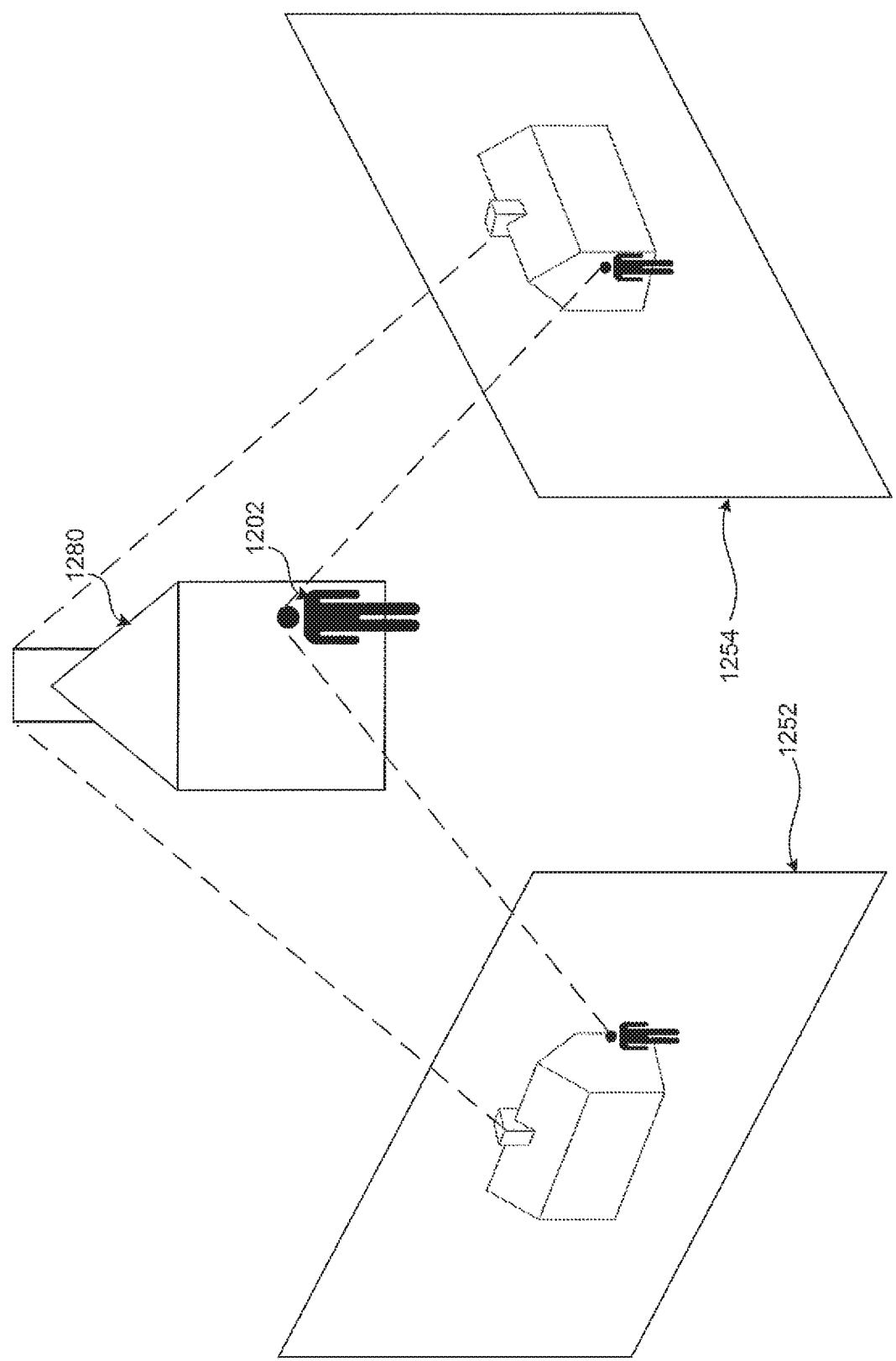
FIG. 12 is a schematic diagram illustrating the principle of Visual Inertial Odometry, as it may be applied according to an embodiment.

Computer vision may be applied to captured images to estimate positions and/or orientations of a UAV 100 and/or other physical objects surrounding the UAV 100. This process is generally referred to as "Visual Odometry" or "Visual Inertial Odometry" (VIO). FIG. 12 illustrates the concept behind VIO at a high level. A plurality of images are captured in sequence as an image capture device moves through space. Due to the movement of the camera, the images captured of the surrounding space change from frame to frame. Specifically, FIG. 12 illustrates the change in captured images from an initial image capture FOV 1252 at a first position and time to a subsequent image capture FOV 1254 at a second position and time. In both images, the image capture device may capture real world physical objects, for example, the house 1280 and/or a human 1202. Computer vision techniques are applied to the sequence of images to detect and match features of physical objects captured in the field of view of the camera. For example, a system employing computer vision may search for correspondences in the pixels of digital images that have overlapping FOV. The correspondences may be identified using a number of different methods such as correlation-based and feature-based methods. As shown in FIG. 12, features such as the head of a human subject 1202 or the corner of the chimney on the house 1280 can be identified, matched, and thereby tracked. Further, by incorporating sensor data from an IMU (or an accelerometer or gyroscope) associated with the UAV 100 (or specifically with the image capture device) to the tracked features of the image capture, estimations may be made for the position and/or orientation of the image capture device (and by extension the UAV 100) over time. As previously mentioned position, orientation, and motion estimation based in part on sensor data from an on-board IMU may introduce error propagation issues. As previously stated, optimization techniques may be applied to position, orientation, and motion estimations to counter such uncertainties. In some embodiments, a nonlinear "smoothing" estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

Unmanned Aerial Vehicle—Example System

A UAV 100, according to the present teachings, may be implemented as any type of unmanned aerial vehicle. A UAV, sometimes referred to as a drone, is generally defined as any aircraft capable of controlled flight without a human pilot onboard. UAVs may be controlled autonomously by onboard computer processors or via remote control by a remotely located human or computer pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations where precise positional adjustments are involved such as during a payload delivery sequence.

Multi-rotor helicopters have emerged as a popular UAV configuration. For example, a quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors thereby increasing or decreasing the vertical thrust. Lateral (i.e., horizontal) adjustments left, right, forward, and backward may be induced through combined pitch/roll maneuvers with balanced applied vertical thrust. For example to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on a horizontal plane. The above described mode of control can similarly be applied to a multi-rotor craft with fewer or more than four rotors. Further, the above described mode of control can be employed to maneuver the payload holder 121 for embodiments where the payload holder 121 includes a propulsion sub-system 162.

Figure 13:
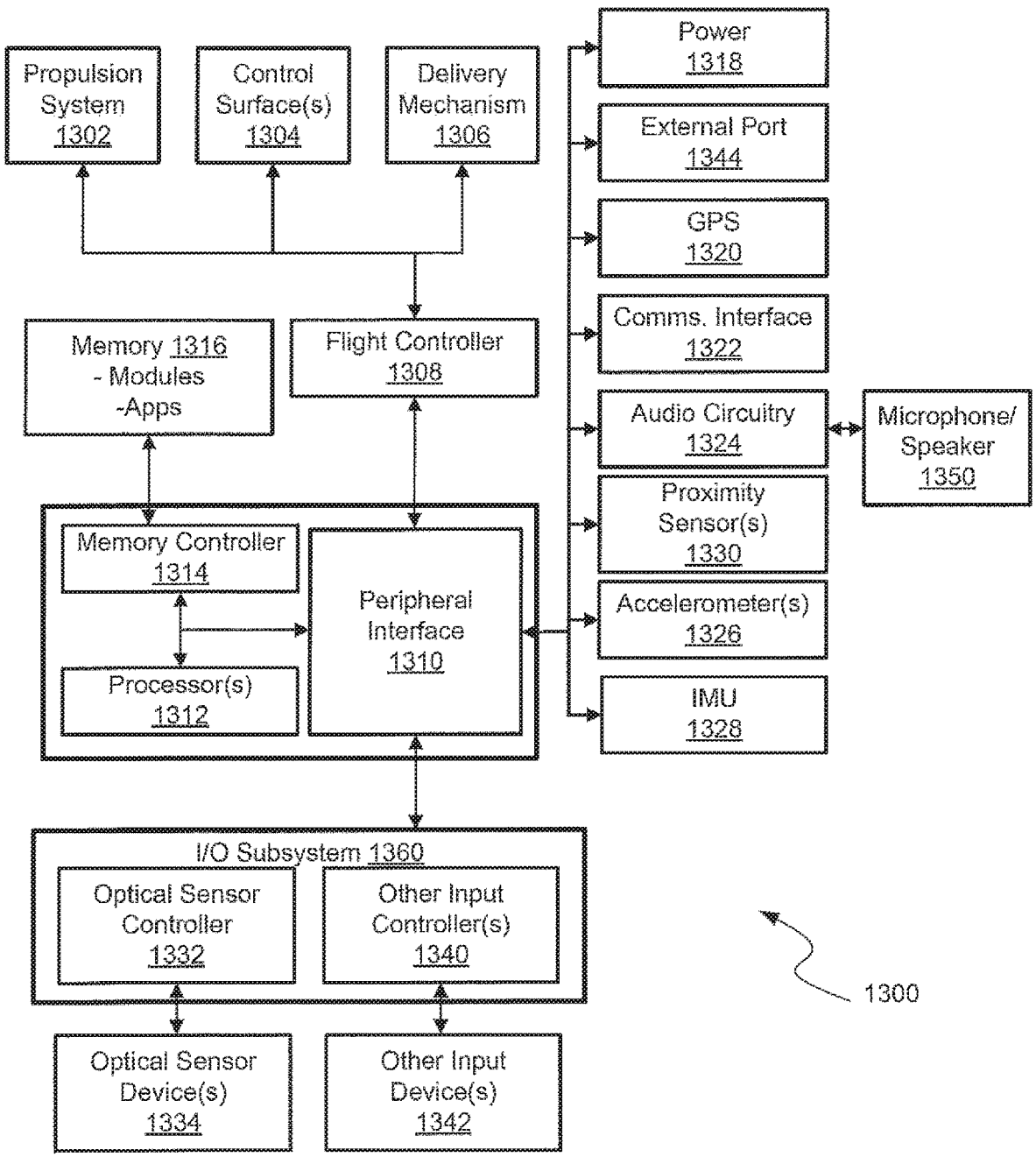
FIG. 13 is a block diagram of an example UAV system according to some embodiments.

FIG. 13 shows a diagram of an example UAV system 1300 including various functional system components that may be part of a UAV 100, according to some embodiments. UAV system 1300 may include a propulsion system 1302, control surfaces 1304, a delivery mechanism 1306, a flight controller 1308, a peripheral interface 1310, a processor(s) 1312, a memory controller 1314, a memory 1316 (which may include one or more computer readable storage mediums), a power module 1318, a GPS module 1320, a communications interface 1322, an audio circuitry 1324, an accelerometer 1326 (including subcomponents such as gyroscopes), an inertial measurement unit (IMU) 1328, a proximity sensor 1330, an optical sensor controller 1332 and one or more associated optical sensors 1334, and any other input controllers 1340 and input devices 1342. One or more of the above mentioned components may communicate over one or more communication buses or signal lines as represented by the arrows in FIG. 13. As mentioned earlier, piloting input may, in some cases, be provided wirelessly by a user on the ground or in another vehicle via a remote control or some other remote computing device (not shown).

The UAV system 1300 is only one example of a system that may be part of a UAV 100. A UAV 100 may include more or fewer components than shown in system 1300, may combine two or more components as functional units, or a may have a different configuration or arrangement of the components. Some of the various components of system 1300 shown in FIG. 13 may be implemented in hardware, software or a combination of both hardware and software, including one or more signal processing and/or application-specific integrated circuits. Further, according to some embodiments, the propulsion system 1302 may include a propulsion sub-system 162 provided to the payload holder 121 to enable maneuvering of the payload independently form the main body of the UAV.

As described earlier, in some embodiments the propulsion system 1302 may comprise a fixed-pitch rotor. The means for propulsion may also be a variable-pitch rotor (for example, using a gimbal mechanism), a variable-pitch jet engine, or any other mode of propulsion having the effect of providing a thrust force. The means for propulsion 1302 may include a means for varying the applied thrust force, for example via an electronic speed controller varying the speed of each fixed-pitch rotor.

In some cases, UAV 100 may include control surfaces such as flaps, rudders, ailerons, etc. Similar to the propulsion system 1302, the control surfaces 1304 may include means for adjusting the control surfaces such as electronic motors, cable pulley systems, or hydraulic systems.

As previously discussed, the delivery mechanism 1306 may in some embodiments include a motorized cable spool configured to deploy and retract an extendable tether, such as a length of cable. The delivery mechanism 1306 may also include a payload holder 121 comprising a detachable coupling for securing and releasing a payload 150. In some embodiments, the delivery mechanism 1306 may include a tether controller for controlling a state of extension of the extendable tether. The payload holder 121 may be connected to the extendable tether for delivering the payload 150 to the delivery surface 230 when the main body of the UAV is in flight.

The flight controller 1308 (sometimes referred to as a "controller", a "navigation system" or "autopilot") may include a combination of hardware and/or software configured to receive input data (e.g., sensor data from image capture devices 1334), interpret the data and output control commands to the propulsion systems 1302, control surfaces 1304, and/or delivery mechanism 1306 of the UAV 100. Alternatively or in addition, a flight controller 1308 may be configured to receive control commands generated by another component or device (e.g., processors 1312 and/or a remote computing device), interpret those control commands and generate control signals configured for the propulsion system 1302, control surfaces 1304, and/or delivery mechanism 1306. In some embodiments, some or all of the functionality associated with the flight controller 1308 may be provided by a propulsion controller for controlling the position of the main body during flight on the basis of one or more propulsion commands. In other embodiments, some or all of the functionality associated with the flight controller 1308 may be provided by a first propulsion controller for controlling a first propulsion system provided to the main body of the UAV 100 and a second propulsion controller for controlling a second propulsion system (i.e., a propulsion sub-system) provided to the payload holder 121 of the UAV. In such embodiments, the first propulsion controller may control the first propulsion system on the basis of first propulsion control data which includes one or more first propulsion commands, and the second propulsion controller may control the second propulsion system on the basis of second propulsion control data which includes one or more second propulsion commands.

The memory 1316 may include high-speed random access memory and may also include non-volatile memory, such as one or more magnetic disk storage devices, flash memory devices, or other non-volatile solid-state memory devices. Access to the memory 1316 by other components of system 1300, such as the processors 1312 and the peripherals interface 1310, may be controlled by the memory controller 1314.

The peripherals interface 1310 may couple the input and output peripherals of system 1300 to the processor(s) 1312 and memory 1316. The one or more processors 1312 run or execute various software programs and/or sets of instructions stored in memory 1316 to perform various functions for the UAV 100 and to process data. In some embodiments, processors 1312 may include general central processing units (CPUs), specialized processing units such as Graphical Processing Units (GPUs) particularly suited to parallel processing applications, or any combination thereof.

In some embodiments, the peripherals interface 1310, the processor(s) 1312, and the memory controller 1314 may be implemented on a single integrated chip. In some other embodiments, one or more of the peripherals interface 1310, the processor(s) 1312, and the memory controller 1314 may be implemented may be implemented on separate chips.

The network communications interface 1322 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments the network communications interface may include RF circuitry. In such embodiments RF circuitry may convert electrical signals to/from electromagnetic signals and communicate with communications networks and other communications devices via the electromagnetic signals. The RF circuitry may include well-known circuitry for transmission and reception of communications signals, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and reception of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi™) (e.g., IEEE 802.11n and/or IEEE 802.11ac), voice over Internet Protocol (VoIP), Wi-MAX, or any other suitable communication protocols.

The audio circuitry 1324, including the speaker and microphone 1350 may provide an audio interface between the surrounding environment and the UAV 100. The audio circuitry 1324 may receive audio data from the peripherals interface 1310, convert the audio data to an electrical signal, and transmits the electrical signal to the speaker 1350. The speaker 1350 may convert the electrical signal to human-audible sound waves. The audio circuitry 1324 may also receive electrical signals converted by the microphone 1350 from sound waves. The audio circuitry 1324 may convert the electrical signal to audio data and transmit the audio data to the peripherals interface 1310 for processing. Audio data may be retrieved from and/or transmitted to memory 1316 and/or the network communications interface 1322 by the peripherals interface 1310.

The I/O subsystem 1360 may couple input/output peripherals of UAV 100, such as an optical sensor system 1334 and other input/control devices 1342, to the peripherals interface 1310. The I/O subsystem 1360 may include an optical sensor controller 1332 and other input controller(s) 1340 for other input or control devices. The one or more input controllers 1340 receive/send electrical signals from/to other input or control devices 1342.

The other input/control devices 1342 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to the user 102. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1316) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

UAV system 1300 also includes a power system 1318 for powering the various components. The power system 1318 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in computerized device.

UAV system 1300 may also include one or more image capture devices 1334. FIG. 13 shows an image capture device 1334 coupled to an image capture controller 1332 in I/O subsystem 1360. The image capture device 1334 may include one or more optical sensors. For example, image capture device 1334 may include a charge-coupled device (CCD) or complementary metal-oxide semiconductor (CMOS) phototransistors. The optical sensors of image capture device 1334 receive light from the environment, projected through one or more lens (the combination of an optical sensor and lens can be referred to as a "camera") and converts the light to data representing an image. In conjunction with an imaging module located in memory 1316, the image capture device 1334 may capture images (including still images and/or video). In some embodiments, an image capture device 1334 may include a single fixed camera. In other embodiments, an image capture device 1334 may include a single adjustable camera (adjustable using a gimbal mechanism with one or more axes of motion). In some embodiments, an image capture device 1334 may include a camera with a wide-angle lens providing a wider field of view. In some embodiments, an image capture device 1334 may include an array of multiple cameras providing up to a full 360 degree view in all directions. In some embodiments, an image capture device 1334 may include two or more cameras (of any type as described herein) placed next to each other in order to provide stereoscopic vision. In some embodiments, an image capture device 1334 may include multiple cameras of any combination as described above. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for navigation (e.g., using VIO).

UAV system 1300 may also include one or more proximity sensors 1330. FIG. 13 shows a proximity sensor 1330 coupled to the peripherals interface 1310. Alternately, the proximity sensor 1330 may be coupled to an input controller 1340 in the I/O subsystem 1360. Proximity sensors 1330 may generally include remote sensing technology for proximity detection, range measurement, target identification, etc. For example, proximity sensors 1330 may include radio-based sensors (e.g., radar), audio-based sensors (e.g., sonar), optical-based sensors (e.g., LIDAR), etc.

UAV system 1300 may also include one or more accelerometers 1326. FIG. 13 shows an accelerometer 1326 coupled to the peripherals interface 1310. Alternately, the accelerometer 1326 may be coupled to an input controller 1340 in the I/O subsystem 1360.

UAV system 1300 may include one or more IMUs 1328. An IMU 1328 may measure and report the UAV's velocity, acceleration, orientation, and gravitational forces using a combination of gyroscopes and accelerometers (e.g., accelerometer 1326).

UAV system 1300 may include a receiver such as a global positioning system (GPS) receiver 1320 for obtaining a position of the main body of the UAV. FIG. 13 shows a GPS receiver 1320 coupled to the peripherals interface 1310. Alternately, the GPS receiver 1320 may be coupled to an input controller 1340 in the I/O subsystem 1360. The GPS receiver 1320 may receive signals from GPS satellites in orbit around the earth, calculate a distance to each of the GPS satellites (through the use of GPS software), and thereby pinpoint a current global position of UAV 100. In some embodiments, positioning of UAV 100 may be accomplished without GPS satellites through the use of other techniques as described herein. In some embodiments, the payload holder 121 may also include a receiver, such as a GPS receiver for obtaining a position of the payload holder 121, independently of the main body of the UAV.

In some embodiments, the software components stored in memory 1316 may include an operating system, a communication module (or set of instructions), a flight control module (or set of instructions), a localization module (or set of instructions), a computer vision module, a graphics module (or set of instructions), and other applications (or sets of instructions). For clarity one or more modules and/or applications may not be shown in FIG. 13.

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1344 and may also include various software components for handling data transmission via the network communications interface 1322. The external port 1344 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including without limitation text, still images, videos, animations, icons (such as user-interface objects including soft keys), and the like. The graphics module in conjunction with a graphics processing unit (GPU) 1312 may process in real time or near real time, graphics data captured by optical sensor(s) 1334 and/or proximity sensors 1330.

A computer vision module, which may be a component of graphics module, provides analysis and recognition of graphics data. For example, while UAV 100 is in flight, the computer vision module along with graphics module (if separate), GPU 1312, and image capture devices(s) 1334 and/or proximity sensors 1330 may recognize and track the captured image of another object in the physical environment. The computer vision module may further communicate with a localization/navigation module and/or flight control module to update a relative position between UAV 100 and a point of reference, for example a target object (e.g., payload 150, payload holder 121, or delivery surface 230).

A positioning/navigation module may determine the position and/or orientation of UAV 100 and other objects and provides this information for use in various modules and applications (e.g., to a flight control module in order to generate commands for use by the flight controller 1308).

One or more image capture devices 1334 in conjunction with, image capture device controller 1332, and a graphics module, may be used to capture images (including still images and video) and store them into memory 1316.

Each of the above identified modules and applications correspond to a set of instructions for performing one or more functions described above. Described modules (i.e., sets of instructions) need not be implemented as separate software programs, procedures or modules, and thus various subsets of the described modules may be combined or otherwise re-arranged in various embodiments. In some embodiments, memory 1316 may store a subset of the modules and data structures identified above. Furthermore, memory 1316 may store additional modules and data structures not described above.

Manned Aerial Vehicle Applications

The techniques for payload-based control of a UAV described above can similarly be applied in the context of manned aircraft as well. Take for example the scenario depicted in FIG. 10A. As shown in FIG. 10A, a manned VTOL aircraft (e.g., a helicopter) 1000a has arrived overhead a delivery surface 1030a. In this scenario, human pilots 1040a (e.g., depicted in detail 1080a) may have manually flown the aircraft 1000a for at least part of the way from a first location to a second location where the delivery surface 1030a is located. Once at the second location, a process for manually selecting the delivery surface through user input (e.g., as described with respect to FIG. 5) or automatically selecting the delivery surface using computer vision (e.g., as described with respect to FIG. 6) may be performed. For example, a human pilot 1040a may manually select the delivery surface 1030a by touching a region of the display screen 1082a (shown in detail 1080a) that is displaying a video feed from a downward facing image capture device mounted to the aircraft 1000a (e.g., similar to the process described with respect to FIG. 5). Once the delivery surface 1030a is selected, control of the aircraft 1000a may be handed over to a flight controller (i.e., an autopilot) to autonomously maneuver the aircraft 1000 while lowering the payload 1050a using the delivery mechanism 1020a based at least in part on images captured from an image capture device mounted to the aircraft 1000a.

Example Computer Processing System

Figure 14:
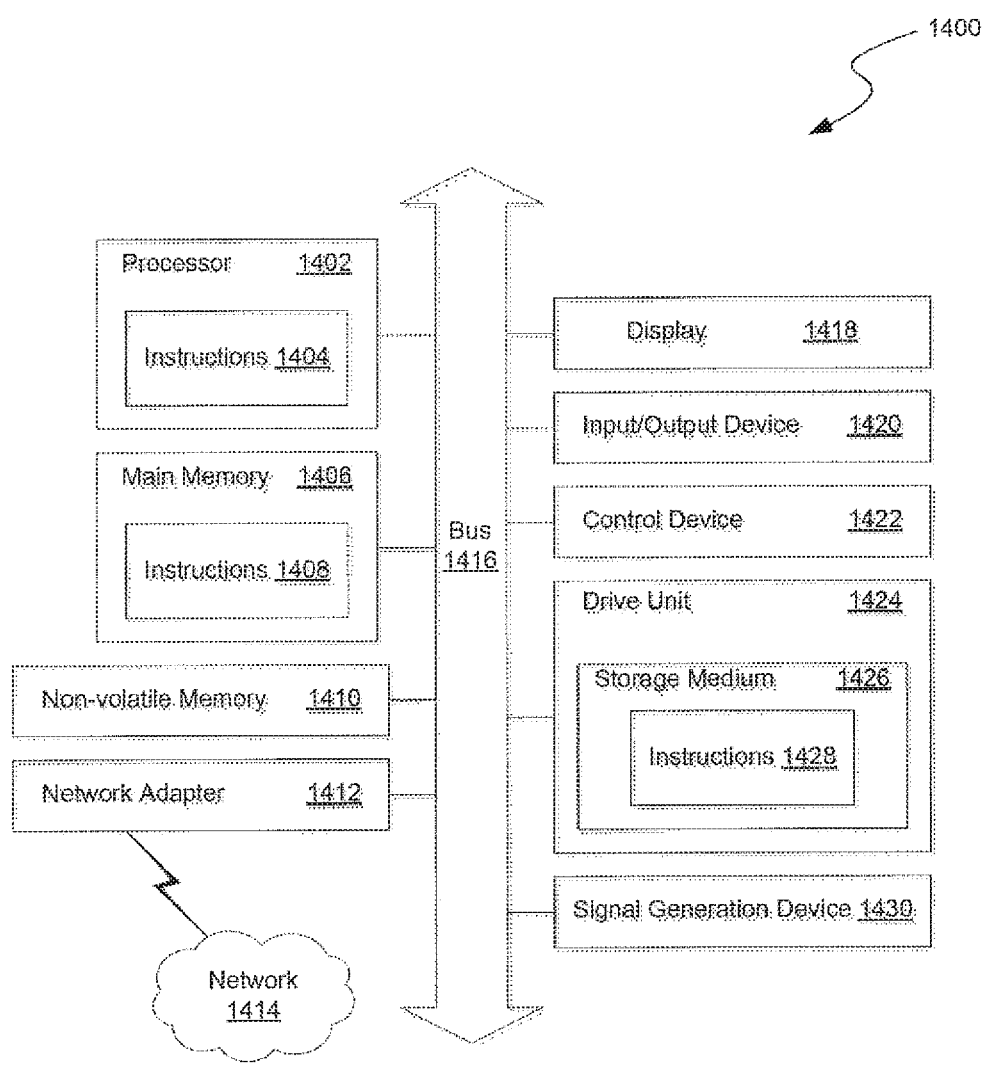
FIG. 14 is a block diagram illustrating an example of a processing system that may be utilized by embodiments as described herein.

FIG. 14 is a block diagram illustrating an example of a processing system 1400 in which at least some operations described herein can be implemented. As an example, at least a portion of the processing system 1400 may be included in UAV 100 or any external computing device in communication with UAV 100. The processing system 1400 may include one or more central processing units ("processors") 1402, main memory 1406, non-volatile memory 1410, network adapter 1412 (e.g., network interfaces), display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents any one or more separate physical buses, point to point connections, or both connected by appropriate bridges, adapters, or controllers. The bus 1416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire". A bus may also be responsible for relaying data packets (e.g., via full or half duplex wires) between components of the network appliance, such as the switching fabric, network port(s), tool port(s), etc.

In various embodiments, the processing system 1400 operates as a standalone device, although the processing system 1400 may be connected (e.g., wired or wirelessly) to other machines.

In various embodiments, the processing system 1400 may be a server computer, a client computer, a personal computer (PC), a user device, a tablet PC, a laptop computer, a personal digital assistant (PDA), a cellular telephone, an iPhone™, an iPad™, a Blackberry™, a processor, a telephone, a web appliance, a network router, switch or bridge, a game console, or any other machine capable of executing a set of instructions (sequential or otherwise) that specify actions to be taken by the computing system.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs". The computer programs typically comprise one or more instructions (e.g., instructions 1404, 1408, 1428) set at various times in various memory and storage devices in a computer, and that, when read and executed by one or more processing units or processors 1402, cause the processing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1410, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1412 enables the processing system 1400 to mediate data in a network 1414 with an entity that is external to the processing system 1400, such as a network appliance, through any known and/or convenient communications protocol supported by the processing system 1400 and the external entity. The network adapter 1412 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. The specification and drawings are to be regarded in an illustrative sense rather than a restrictive sense.

What is claimed is:

1. A method performed by a processing system, the method comprising:
  causing an unmanned aerial vehicle (UAV) to pick up and secure a payload at a first physical location using a retractable delivery mechanism attached to a main body of the UAV, wherein the retractable delivery mechanism includes a payload holder;
  generating control commands configured to cause the UAV to fly from the first location to a designated second physical location;
  obtaining first sensor data at the designated second physical location using one or more sensors on the main body of the UAV;
  based on the first sensor data, obtaining one or more characteristics of an area including a plurality of candidate delivery surfaces at the second physical location;
  obtaining rule data indicative of one or more criteria associated with an appropriate delivery surface;
  based on the obtained one or more characteristics and the obtained rule data, selecting, from the plurality of candidate delivery surfaces, a first delivery surface in the area; and
  causing the retractable delivery mechanism to lower the payload holder towards the selected first delivery surface;
  after the payload holder has been at least partly lowered by the retractable delivery mechanism:
    obtaining second sensor data using one or more sensors on the payload holder;
    based on the second sensor data, obtaining one or more other characteristics of a plurality of other candidate delivery surfaces; and
    automatically selecting, from the plurality of other candidate delivery surfaces, a second delivery surface, different from the first delivery surface, based on a comparison between the one or more other characteristics and the obtained rule data; and
  causing the retractable delivery mechanism to lower the payload onto the second delivery surface.

2. The method of claim 1, wherein the obtained one or more characteristics include one or more of:
  a type of material on at least part of the area;
  a size of at least part of the area;
  a slope of at least part of the area;
  a distance between at least part of the area and a selected delivery location; and
  a proximity from at least part of the area to one or more other detected objects.

3. The method of claim 1, comprising obtaining data indicative of one or more current environmental conditions and selecting the first delivery surface at least in part on the current environmental condition data.

4. The method of claim 1, wherein the rule data include one or more temporal criteria, and the method comprises selecting the first delivery surface at least in part on a current time.

5. The method of claim 1, comprising:
  obtaining at least one of:
    (i) data indicative of a prior history of successful or unsuccessful delivery to the are; or
    (ii) data indicative of a prior history of successful or unsuccessful delivery to other areas with one or more characteristics corresponding to the one or more characteristics of the area; and
  selecting the first delivery surface based at least in part on the prior history data.

6. The method of claim 1, comprising:
  selecting the first delivery surface from the plurality of candidate surfaces based on a comparison between the obtained one or more characteristics and the rule data.

7. The method of claim 1, comprising:
  obtaining a specification of a delivery area at the designated second physical location;
  using the first sensor data, identifying the area based on the delivery area specification.

8. The method of claim 7, wherein the area is identified using an object model, the area being identified using object recognition based on the object model.

9. The method of claim 7, wherein the specification includes a target image pattern, and wherein the area is identified using image pattern recognition based on the target image pattern.

10. The method of claim 7, wherein the specification includes a target signal pattern, and wherein the area is identified based on recognition of the target signal pattern.

11. The method of claim 1, wherein the second sensor data comprises a signal identified using at least one of Wi-Fi, Bluetooth and Infrared short range radio signals.

12. The method of claim 1, comprising:
obtaining data defining a descent cone defining an allowable range of three-dimensional positionings of the payload holder with respect to a position above the selected first or second delivery surface;
operating the retractable delivery mechanism to lower the payload holder from the main body towards the selected first or second delivery surface;
monitoring a current position of the payload holder with respect to the three-dimensional positionings defining the descent cone; and
operating a propulsion system of the UAV to control a position of the payload holder with respect to the three-dimensional positionings defining the descent cone.

13. The method of claim 12, wherein the propulsion system comprises a propulsion sub-system attached to the payload holder, and the method comprises causing the propulsion sub-system to apply a thrust force to the payload holder to adjust the position of the payload holder with respect to the descent cone.

14. The method of claim 12, in which the three dimensional positionings of the descent cone are determined on the basis of one or more obstacles in the vicinity of the selected delivery surface.

15. The method of claim 12, in which the three dimensional positionings of the descent cone are determined on the basis of atmospheric conditions at the selected delivery location.

16. The method of claim 12, comprising:
obtaining data defining an allowable range of three-dimensional positionings of the main body while the retractable delivery mechanism is lowering the payload holder from the main body towards the selected first or second delivery surface; and
operating the propulsion system to control a position of the main body with respect to the allowable range of three-dimensional positionings.

* * * * *